US012812384B2

(12) United States Patent
Messous

(10) Patent No.: US 12,812,384 B2
(45) Date of Patent: Nov. 24, 2026

(54) SECURITY POLICY DETERMINATION AND APPLICATION

(71) Applicant: Fujitsu Limited, Kawasaki (JP)

(72) Inventor: Ayoub Messous, Slough (GB)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 18/520,835

(22) Filed: Nov. 28, 2023

(65) Prior Publication Data

US 2024/0267737 A1 Aug. 8, 2024

(30) Foreign Application Priority Data

Feb. 7, 2023 (EP) .................................... 23155403

(51) Int. Cl.
*H04W 12/37* (2021.01)
*H04W 12/122* (2021.01)
*H04W 12/63* (2021.01)

(52) U.S. Cl.
CPC ......... *H04W 12/37* (2021.01); *H04W 12/122* (2021.01); *H04W 12/63* (2021.01)

(58) Field of Classification Search
CPC ... H04W 12/37; H04W 12/122; H04W 12/63; H04W 12/67; G06F 21/577; G06N 5/048; H04L 63/1433
See application file for complete search history.

(56) References Cited

U.S. PATENT DOCUMENTS 10,803,400 B2 10/2020 Sindia et al.
2007/0156614 A1 7/2007 Flinn et al.
2008/0083029 A1* 4/2008 Yeh .................... H04L 63/1441 709/224
2008/0102797 A1 5/2008 Coleman et al.
2009/0077666 A1 3/2009 Chen et al.
2016/0292938 A1* 10/2016 Zakaria ............. G07C 9/00309
(Continued)

FOREIGN PATENT DOCUMENTS

AU 2018203906 A1 1/2020
AU 2021102104 A4 6/2021
EP 4057569 A1 9/2022
(Continued)

OTHER PUBLICATIONS

Cost of a Data Breach Full Report 2022. (59 pages).
(Continued)

*Primary Examiner* — Farid Homayounmehr
*Assistant Examiner* — Suman Debnath
(74) *Attorney, Agent, or Firm* — WHDA, LLP

(57) ABSTRACT

A computer-implemented method of implementing a security policy for a device, comprising: receiving a value for each of a plurality of measurements, performing an inference process to determine the security policy for the device; and applying the determined security policy, wherein the inference process comprises: determining a plurality of output variable-value pairs corresponding respectively to a plurality of variable-value pair combinations, aggregating the plurality of output variable-value pairs to determine a numerical value representing the risk of attack on the device; and determining the security policy to apply according to the determined numerical value representing the risk of attack on the device.

15 Claims, 21 Drawing Sheets

(56) References Cited

U.S. PATENT DOCUMENTS

2021/0112076 A1 4/2021 Huston, III et al.

FOREIGN PATENT DOCUMENTS

WO 2021/068096 A1 4/2021
WO 2021/160499 A1 8/2021

OTHER PUBLICATIONS

Furnell, Steven, Harry Heyburn, Andrew Whitehead, and Jayesh Navin Shah, "Understanding the full cost of cyber security breaches." Computer Fraud & Security 2020, No. 12 (2020); 6-12. (7 pages).
K. Venugopal, A. Kumar, "Centralized heart rate monitoring and automated message alert system using WBAN. International Journal of Scientific and Research Publications", vol. 3, No. 9, Sep. 2013. (4 pages).
B. Yuvaradni, D. Dhanashri, Gunjal Sonali, Tekale Gauri and Mr. Sandip Thite, "Health Monitoring Services Using Wireless Body Area Network. Imperial Journal of Interdisciplinary Research (IJIR)", vol. 2, No. 5. pp. 1648-1651, 2016. (4 pages).
M. U. H. A. Rasyid, F. A. Saputra and A. Christian, "Implementation of blood glucose levels monitoring system based on Wireless Body Area Network," 2016 IEEE International Conference on Consumer Electronics-Taiwan (ICCE-TW), Nantou, pp. 1-2, 2016. (2 pages).
M. Patel and J. Wang , "Applications, challenges, and prospective in emerging body area networking technologies," IEEE Trans. Wireless Commun., vol. 17, No. 1, pp. 80-88, Feb. 2010. (9 pages).
M. Younis, N. Krajewski, and O. Farrag, "Adaptive security provision for increased energy efficiency in Wireless Sensor Networks," 2009 IEEE 34th Conference on Local Computer Networks, Oct. 2009, pp. 999-1005. (8 pages).
K. Shi, X. Qin, Q. Cheng, and Y. Cheng, "Designing a Reconfigurable Security Architecture for Wireless Sensor Networks," World Congress on Software Engineering, IEEE, 2009, pp. 154-158. (6 pages).
A.V. Taddeo, L. Micconi, and A. Ferrante, "Gradual adaptation of security for sensor networks," Proceedings of the IEEE International Symposium on a World of Wireless Mobile and Multimedia Networks, IEEE, 2010, pp. 1-9. (10 pages).
Gheorghe, L., Rughinis, R., & Tapus, N. "Adaptive security framework for wireless sensor networks" In International Conference on Intelligent Networking and Collaborative Systems (INCoS), 2012 4th (pp. 636-641). IEEE.(Sep. 2012) (6 pages).
D. Trcek, H. Abie, and A. Skomedal, "Adaptive safety for internet of things in e-health," in 2014 IEEE International Conference on Communications (ICC), Jun. 2014, pp. 920-925. (11 pages).
Hellaoui, Hamed, Abdelmadjid Bouabdallah, and Mouloud Koudil. "Tas-iot: trust-based adaptive security in the iot." IEEE 41st Conference on Local Computer Networks (LCN), 2016. IEEE, 2016. (4 pages).
"Information technology—Security Techniques—Information security risk management" ISO/IEC Standard 27005:2011. International Organization for Standardization. ISO, 2011. ISO/IEC 27005. (77 pages).
S.N. Sivanandam, S. Sumathi, S.N. Deepa, "Introduction to Fuzzy Logic using MATLAB" vol. 1, Springer, Berlin, 2007. (441 pages).
M.G. Singh, P. Kumai, D. Goyal, "A Review: Fuzzy Logic and Its Application, National Conference on Synergetic Trends in Engineering and Technology", STET-2014, Int. J. Eng. Tech. Res. (ISSN: 2321-0869) (2014) 61-66 (special issue). (6 pages).
Extended (Supplementary)European Search Report dated Jul. 7, 2023, issued in counterpart EP Application No. 23155403.1. (10 pages).

* cited by examiner

| Security Level | Description | Energy | Memory | Computation | Network (QoS) | | |
|---|---|---|---|---|---|---|---|
| | | | | | Delay | Packet Loss | Throughput |
| 1- Advanced | AES +SHA +ESP | $E_1$ | $M_1$ | $C_1$ | $N^d_1$ | $N^p_1$ | $N^t_1$ |
| 2- Data | DES +SHA+ ESP | $E_2$ | $M_2$ | $C_2$ | $N^d_2$ | $N^p_2$ | $N^t_2$ |
| 3- Medium | SHA+AH | $E_3$ | $M_3$ | $C_3$ | $N^d_3$ | $N^p_3$ | $N^t_3$ |
| 4- Light | MD5+AH | $E_4$ | $M_4$ | $C_4$ | $N^d_4$ | $N^p_4$ | $N^t_4$ |
| 5- No Security | NoAuth+NoEncrp | $E_5$ | $M_5$ | $C_5$ | $N^d_5$ | $N^p_5$ | $N^t_5$ |

FIG. 10

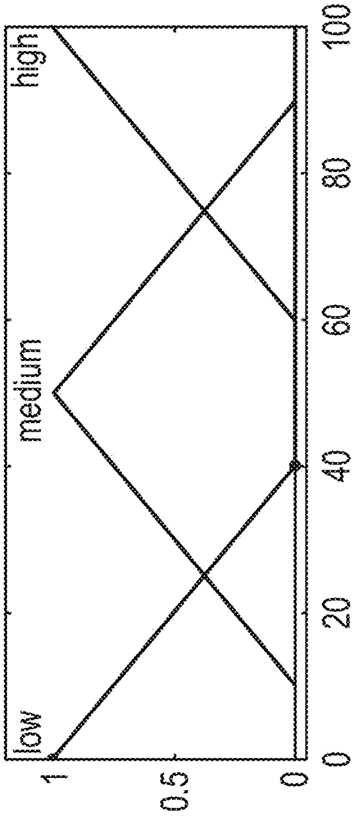
FIG. 12A - Energy
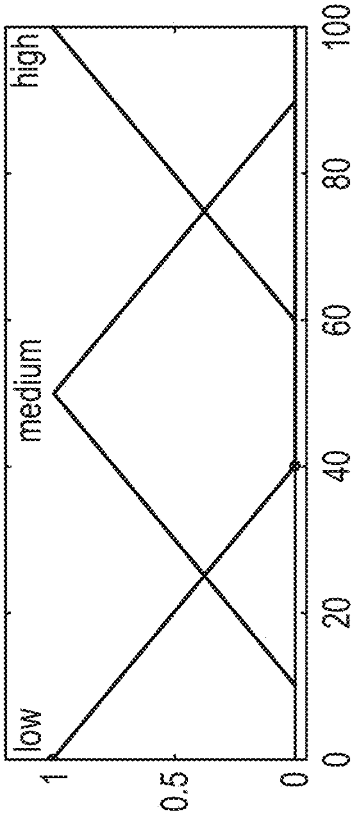
FIG. 12B - Memory
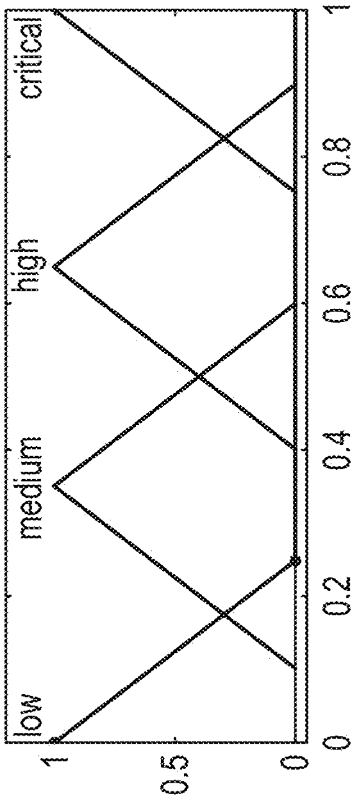
FIG. 12C - Threat

| Adaptive Security | Memory | | Energy Level | | |
|---|---|---|---|---|---|
| | | | low | medium | high |
| Threat Level | low | low | *High* | *High* | *High* |
| | | medium | *High* | *Medium* | *Low* |
| | | high | *High* | *Low* | *High* |
| | medium | low | *Critical* | *High* | *High* |
| | | medium | *High* | *Medium* | *Medium* |
| | | high | *High* | *Medium* | *Low* |
| | high | low | *Critical* | *High* | *High* |
| | | medium | *High* | *High* | *Medium* |
| | | high | *High* | *Medium* | *Medium* |
| | critical | low | *Critical* | *Critical* | *Critical* |
| | | medium | *Critical* | *High* | *High* |
| | | high | *Critical* | *High* | *High* |

FIG. 13

1. If (memory is low) and (threat is low) then (security is high) (1)
2. If (energy is low) and (threat is low) then (security is high) (1)
3. If (energy is medium) and (memory is medium) and (threat is low) then (security is medium) (1)
4. If (energy is high) and (memory is medium) and (threat is low) then (security is low) (1)
5. If (energy is medium) and (memory is high) and (threat is low) then (security is low) (1)
6. If (energy is high) and (memory is high) and (threat is low) then (security is high) (1)
7. If (energy is low) and (memory is low) and (threat is medium) then (security is critical) (1)
8. If (energy is low) and (memory is not low) and (threat is medium) then (security is high) (1)
9. If (energy is not low) and (memory is low) and (threat is medium) then (security is high) (1)
10. If (energy is not low) and (memory is medium) and (threat is medium) then (security is medium) (1)
11. If (energy is medium) and (memory is not low) and (threat is medium) then (security is medium) (1)
12. If (energy is high) and (memory is high) and (threat is medium) then (security is low) (1)
13. If (energy is low) and (memory is low) and (threat is high) then (security is critical) (1)
14. If (energy is not low) and (memory is low) and (threat is high) then (security is high) (1)
15. If (energy is low) and (memory is not low) and (threat is high) then (security is high) (1)
16. If (energy is medium) and (memory is medium) and (threat is high) then (security is high) (1)
17. If (energy is not low) and (memory is high) and (threat is high) then (security is medium) (1)
18. If (energy is high) and (memory is not low) and (threat is high) then (security is medium) (1)
19. If (energy is low) and (threat is critical) then (security is critical) (1)
20. If (memory is low) and (threat is critical) then (security is critical) (1)
21. If (energy is low) and (memory is not low) and (threat is critical) then (security is high) (1)

FIG. 14

SECURITY POLICY DETERMINATION AND APPLICATION

The present invention relates to security policy/level determination and application, and in particular to a computer-implemented method, a computer program, and an information programming apparatus.

The Internet of Things (IoT) is the world's answer to the demand for global connectivity. Having gradually gained traction, a connected world of devices is now crystallizing, and it is expected there will be 75 billion such devices by 2025 (Furnell et al. "Understanding the full cost of cyber security breaches." Computer Fraud & Security 2020, no. 12 (2020): 6-12). Furthermore, as 5G technology plays an increasingly important role in our lives, the hyperconnected landscape will grow, acting as a catalyst and demanding even greater IoT security. On the one hand, while the need to establish a secure-by-design IoT framework is at the top of many business agendas, it is rarely implemented to the extent necessary. On the other hand, as recent research highlighted, the cost of security is a significant cause of hesitation (K. Venugopal, A. Kumar, "Centralized heart rate monitoring and automated message alert system using WBAN", International Journal of Scientific and Research Publications, Vol. 3, no 9, September 2013). Specifically, this issue spans over the entire value chain, from the design stage through to final product deployment, suggesting that the full benefits of IoT security are often being overlooked. Nevertheless, as stakeholders (consumers, businesses, and governments) continue to expect and mandate more secure connected devices, there's always a more pressing need to untap the true potential of IoT security.

In light of the above, a security level determination and application method is desired. Such a method may for example be applied in IoT systems.

According to an embodiment of a first aspect there is disclosed herein a computer-implemented method (of implementing a security policy/level for a device), comprising: receiving a value for each of a plurality of measurements relating to a device, the measurements representing at least two of: an (a remaining) energy level of a battery in the device; an available (storage space in a) memory of a processor in the device; a clock speed of a processor in the device; a bandwidth of a communication channel (between the device and another device with which the device is configured to communicate) of the device; a distance between the device and another device with which the device is configured to communicate (the other device); a frequency of movement of the device; and a received signal strength indication, RSSI, of a signal from the other device with which the device is configured to communicate; performing an (a fuzzy) inference process to determine the security policy for the device; and applying the determined security policy (comprising transmitting and receiving communications with the other device according to the determined security policy), wherein the inference process comprises: providing a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable; for each of the measurements, using the plurality of membership functions provided for the measurement to determine a plurality of truth values, respectively; providing for each of the measurements a plurality of variable-value pairs each comprising a said linguistic variable and its corresponding determined truth value; and determining a plurality of output variable-value pairs corresponding respectively to a plurality of variable-value pair combinations (each comprising one determined variable-value pair per (for) each of a plurality of the measurements), wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination (and using at least one rule defining a mathematical combination of the truth values (defining how to combine said truth values to determine a said risk truth value)), wherein the inference process further comprises: consolidating/aggregating the plurality of output variable-value pairs to determine a numerical value representing the (a) risk of attack on the device (according to rules defining how to consolidate output variable-value pairs); and determining the security policy to apply according to the determined numerical value representing the risk of attack on the device (wherein determining the security policy comprises determining to apply a first security policy when the determined numerical value is below a first threshold or in a first range and determining to apply a second security policy, (having higher (and more resource-intensive) security requirements than the first security policy), when the numerical value is above a second threshold or within a second range).

According to an embodiment of a second aspect there is disclosed herein (for example as an alternative to the first aspect) a computer-implemented method comprising: receiving a value for each of a plurality of measurements relating to a device, the measurements representing at least two of: an (a remaining) energy level of a battery in the device; an available (storage space in a) memory of a processor in the device; a clock speed of a processor in the device; a bandwidth of a communication channel (between the device and another device with which the device is configured to communicate) of the device; a distance between the device and another device with which the device is configured to communicate (the other device); a frequency of movement of the device; and a received signal strength indication, RSSI, of a signal from the other device with which the device is configured to communicate; performing an inference process to determine a security policy for the device; and applying the determined security policy (comprising transmitting and receiving communications with the other device according to the determined security policy), wherein the inference process comprises: using a plurality of membership functions provided for each of the measurements to determine truth values indicative of how well the measurement's value is described by respective linguistic variables corresponding to the respective membership functions; determining a plurality of risk linguistic variables based at least on combinations of the said linguistic variables, and determining a plurality of corresponding risk truth values based on the truth values of the linguistic variables of the combinations; and determining a numerical value representing a risk of attack on the device based on the risk linguistic variables and the corresponding risk truth values, and determining the security policy according to the numerical value.

Determining the security policy may comprise determining to apply a first security policy when the determined numerical value is in a first range (or below a first threshold) and determining to apply a second security policy, (having higher (and more resource-intensive) security requirements than the first security policy), when the numerical value is in a second range (or above/below a second threshold).

The first and second ranges do not overlap.

The numerical value may represent the capability of the device to implement security policies as well as the risk of attack on the device.

The rules defining mappings between the risk linguistic variables and combinations of linguistic variables of the measurements may comprise if-then rules and/or if-and-then rules.

The device may be part of an internet-of-things system.

The device may be a sensor for detecting a physiological measurement of a patient.

The device may be part of a system for detecting (and analyzing) physiological measurements of a patient.

The system may include a server and an apparatus to perform analysis of the physiological measurements located remotely from the patient.

The device may be configured to communicate with the other device by transmitting the physiological data to the other device.

The computer-implemented method may be performed by the device.

The computer-implemented method may be performed by an apparatus different from the device.

The method may comprise performing the computer-implemented method of implementing a security policy for a plurality of said devices.

The other device may be a base station device.

Receiving the values may comprise measuring the values.

The method may further comprise, before determining the plurality of truth values, normalizing the measurements' values.

The method may comprise performing the inference process and applying the security policy determined as a result of the inference process when a threshold amount of time has expired since the most recent occurrence of performing the inference process.

The method may comprise: monitoring the values of the measurements; and performing the inference process and applying the security policy determined as a result of the inference process when, for any of the measurements, the value of the measurement passes a trigger threshold value.

The trigger threshold value may be unique to each measurement.

The method may comprise: monitoring the values of the measurements; and performing the inference process and applying the security policy determined as a result of the inference process when, for any of the measurements, a difference between a current value and a value used in the most recent occurrence of the inference process is above a threshold change amount.

The threshold change amount may be unique to each measurement.

The method may comprise (receiving the values and) performing the inference process and applying the security policy determined as a result of the inference process when the device changes location (by a threshold distance or more).

The method may comprise (receiving the values and) performing the inference process and applying the security policy determined as a result of the inference process when a new device is added to the system or when the device connects with a new device or when the device receives a connection request from a new device.

The method may comprise receiving a value of a measurement representing an environment of the device, the value of the measurement being a score indicating a threat of attack on the device based on the environment.

The environment may be any of: indoors; outdoors; in a home; and in a hospital.

The method may comprise (receiving the values and) performing the inference process and applying the security policy determined as a result of the inference process when the device moves to a different environment.

The method may comprise determining the security policy for communication with another (the other) device.

The method may comprise transmitting information indicating the determined security policy to the other device with which the device is configured to communicate.

The method may comprise transmitting information indicating the determined security policy to any other devices with which the devices is configured to communicate.

Applying the determined security policy may comprise encrypting data/communications transmitted from the device (to the other device) according to an encryption level/policy/specification/function corresponding to the security policy.

A security policy may be determined from among a plurality of security policies.

Each security policy may be defined by an encryption policy and/or an authentication policy.

Applying the first security policy may comprise encrypting data/communications transmitted from the device (to the other device) according to a first encryption level/policy/specification/function and applying the second security policy comprises encrypting data/communications transmitted from the device (to the other device) according to a second encryption level/policy/specification/function which is more secure (and more resource-intensive) than the first encryption level.

Determining the security policy may comprise determining to apply a first security policy when the determined numerical value is in/within a first range (or below a first threshold), determining to apply a second security policy when the numerical value is in/within a second range (or above the first threshold and below a second threshold), and determining to apply a third security policy when the numerical value is in/within a third range (or above the second threshold). The ranges do not overlap each other.

The third security policy may have higher (and more resource-intensive) security requirements than the second security policy and the second security policy may have higher (and more resource-intensive) security requirements than the first security policy.

Determining the security policy may comprise determining to apply a first security policy when the determined numerical value is in/within a first range (or below a first threshold), determining to apply a second security policy when the numerical value is in/within a second range (or above the first threshold and below a second threshold), determining to apply a third security policy when the numerical value is in/within a third range (or above the second threshold and below a third threshold), and determining to apply a fourth security policy when the numerical value is in/within a fourth range (or above the third threshold).

Determining the security policy may comprise determining to apply a first security policy when the determined numerical value is in/within a first range (or below a first threshold), determining to apply a second security policy when the numerical value is in/within a second range (or above the first threshold and below a second threshold), determining to apply a third security policy when the numerical value is in/within a third range (or above the second threshold and below a third threshold), determining to apply a fourth security policy when the numerical value is in/within a fourth range (or above the third threshold and below a fourth threshold), and determining to apply a fifth security policy when the numerical value is in/within a fifth range (or above the fourth threshold).

Determining the security policy may comprise, based on a plurality of (non-overlapping) ranges of values that the determined numerical value could take, selecting a security policy corresponding to the range in which the determined numerical value falls. Each security policy may correspond to a range of values that the determined numerical value could take.

Applying the first security policy may comprise applying no encryption and/or no authentication to data/communications transmitted from the device (to the other device).

The (first) encryption level corresponding to the first/lowest security policy may comprise no encryption.

The (first) authentication level corresponding to the first/lowest security policy may comprise no authentication.

The second security policy may comprise: Message-Digest algorithm 5, MD5, encryption and/or an authentication header, AH, authentication policy; or Secure Hash Algorithm, SHA, encryption and/or an authentication header, AH, authentication policy; or data encryption standard, DES, and Secure Hash Algorithm, SHA, encryption and/or ESP, encapsulating security payload; or advanced encryption standard, AES, and Secure Hash Algorithm, SHA, encryption and/or encapsulating security payload, ESP, authentication.

The third security policy may comprise: Secure Hash Algorithm, SHA, encryption and/or an authentication header, AH, authentication policy: or data encryption standard, DES, and Secure Hash Algorithm, SHA, encryption and/or ESP, encapsulating security payload; or advanced encryption standard, AES, and Secure Hash Algorithm, SHA, encryption and/or encapsulating security payload, ESP, authentication.

The fourth security policy may comprise: data encryption standard, DES, and Secure Hash Algorithm, SHA, encryption and/or ESP, encapsulating security payload; or advanced encryption standard, AES, and Secure Hash Algorithm, SHA, encryption and/or encapsulating security payload, ESP, authentication.

The fifth security policy may comprise advanced encryption standard, AES, and Secure Hash Algorithm, SHA, encryption and/or encapsulating security payload, ESP, authentication.

The first security policy may comprise no encryption and/or no authentication.

The second security policy may comprise Message-Digest algorithm 5, MD5, encryption and/or an authentication header, AH, authentication policy.

The third security policy may comprise Secure Hash Algorithm, SHA, encryption and/or an authentication header, AH, authentication policy.

The fourth security policy may comprise data encryption standard, DES, and Secure Hash Algorithm, SHA, encryption and/or ESP, encapsulating security payload.

The fifth security policy may comprise advanced encryption standard, AES, and Secure Hash Algorithm, SHA, encryption and/or encapsulating security payload, ESP, authentication.

The method may comprise receiving a value for each of a plurality of measurements representing: the (remaining) energy level of the battery in the device; the available (storage space in) memory of the processor in the device; and a threat of attack on the device based on factors external to the device.

The measurement representing the threat of attack on the device may comprise: the distance between the device and another device with which the device is configured to communicate; or the RSSI of a signal from the other device with which the device is configured to communicate; or a combination of the distance between the device and another device with which the device is configured to communicate and the RSSI of a signal from the other device with which the device is configured to communicate.

Providing a plurality of membership functions may comprise retrieving them from memory and/or receiving them externally and/or receiving them through user input and/or devising them as part of the method and/or retrieving them from an external/internal storage, etc.

According to an embodiment of a third aspect there is disclosed herein a computer-implemented method of implementing a plurality of security policies for communication between a device and a plurality of other devices, respectively, comprising performing the method of the first or second aspects for communication with each other device.

According to an embodiment of a fourth aspect there is disclosed herein a computer program which, when run on a computer, (or comprising instructions which, when executed by the computer) causes the computer to carry out a method (of implementing a security policy/level for a device), comprising: receiving a value for each of a plurality of measurements (relating to a device), the measurements representing at least two of: an (a remaining) energy level of a battery in the device; an available (storage space in a) memory of a processor in the device; a clock speed of a processor in the device; a bandwidth of a communication channel (between the device and another device with which the device is configured to communicate) of the device; a distance between the device and another device with which the device is configured to communicate (the other device); a frequency of movement of the device; and a received signal strength indication, RSSI, of a signal from the other device with which the device is configured to communicate; performing an (a fuzzy) inference process to determine the security policy for the device; and applying the determined security policy (comprising transmitting and receiving communications with the other device according to the determined security policy), wherein the inference process comprises: providing on a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable: for each of the measurements, using the plurality of membership functions provided for the measurement to determine a plurality of truth values, respectively; providing for each of the measurements a plurality of variable-value pairs each comprising a said linguistic variable and its corresponding determined truth value; and determining a plurality of output variable-value pairs corresponding respectively to a plurality of variable-value pair combinations (each comprising one determined variable-value pair per (for) each of a plurality of the measurements), wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination (and using at least one rule defining a mathematical combination of the truth values (defining how to combine said truth values to determine a said risk truth value)), wherein the inference process further comprises: consolidating/aggregating the plurality of output variable-value pairs to determine a numerical value representing the (a) risk of attack on the device (according to rules defining how to consolidate output variable-value pairs); and determining the security policy to apply according to the determined numerical value representing the risk of attack on the device (wherein determining the security policy comprises determining to apply a first security policy when the determined numerical value is below a first threshold or in a first range and determining to apply a second security policy. (having higher (and more resource-intensive) security requirements than the first security policy), when the numerical value is above a second threshold or within a second range).

According to an embodiment of a fifth aspect there is disclosed herein an information processing apparatus comprising a memory and a processor connected to the memory, wherein the processor is configured to implement a security policy/level for a device by: receiving a value for each of a plurality of measurements, the measurements representing at least two of: an (a remaining) energy level of a battery in the device; an available (storage space in a) memory of a processor in the device: a clock speed of a processor in the device; a bandwidth of a communication channel (between the device and another device with which the device is configured to communicate) of the device; a distance between the device and another device with which the device is configured to communicate (the other device); a frequency of movement of the device; and a received signal strength indication, RSSI, of a signal from the other device with which the device is configured to communicate; performing an (a fuzzy) inference process to determine the security policy for the device; and applying the determined security policy (comprising transmitting and receiving communications with the other device according to the determined security policy), wherein the inference process comprises: providing a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable; for each of the measurements, using the plurality of membership functions provided for the measurement to determine a plurality of truth values, respectively; providing for each measurement a plurality of variable-value pairs each comprising a said linguistic variable and its corresponding determined truth value; and determining a plurality of output variable-value pairs corresponding respectively to a plurality of variable-value pair combinations (each comprising one determined variable-value pair per (for) each of a plurality of the measurements), wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination (and using at least one rule defining a mathematical combination of the truth values (defining how to combine said truth values to determine a said risk truth value)), wherein the inference process further comprises: consolidating/aggregating the plurality of output variable-value pairs to determine a numerical value representing the (a) risk of attack on the device (according to rules defining how to consolidate output variable-value pairs); and determining the security policy to apply according to the determined numerical value representing the risk of attack on the device (wherein determining the security policy comprises determining to apply a first security policy when the determined numerical value is below a first threshold or in a first range and determining to apply a second security policy, (having higher (and more resource-intensive) security requirements than the first security policy), when the numerical value is above a second threshold or within a second range).

According to an embodiment of a sixth aspect there is disclosed herein a computer program which, when run on a computer, (or comprising instructions which, when executed by the computer) causes the computer to carry out the method of the second aspect.

According to an embodiment of a seventh aspect there is disclosed herein an information processing apparatus comprising a memory and a processor connected to the memory, wherein the processor is configured to implement a security policy/level for a device by carrying out the method of the second aspect.

Features relating to any aspect/embodiment may be applied to any other aspect/embodiment.

Reference will now be made, by way of example, to the accompanying drawings, in which:

FIG. 10 is a diagram illustrating security levels;

Figure 15:
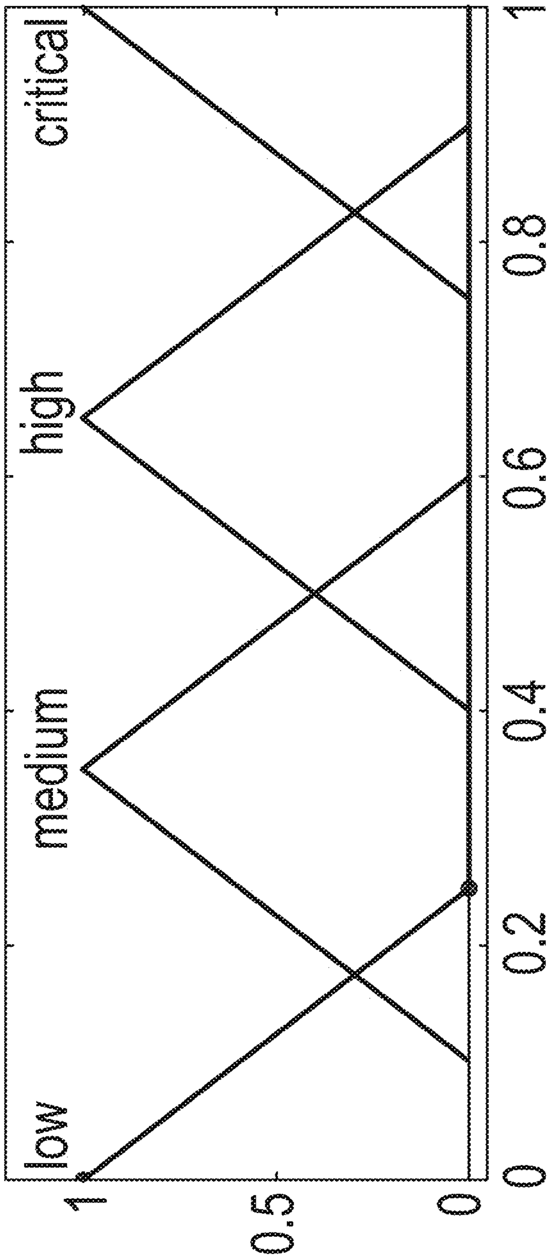
Figure 16A:
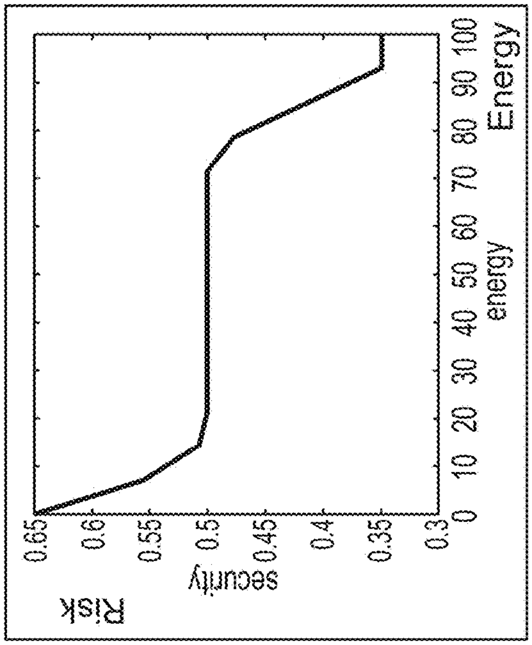
Figure 16B:
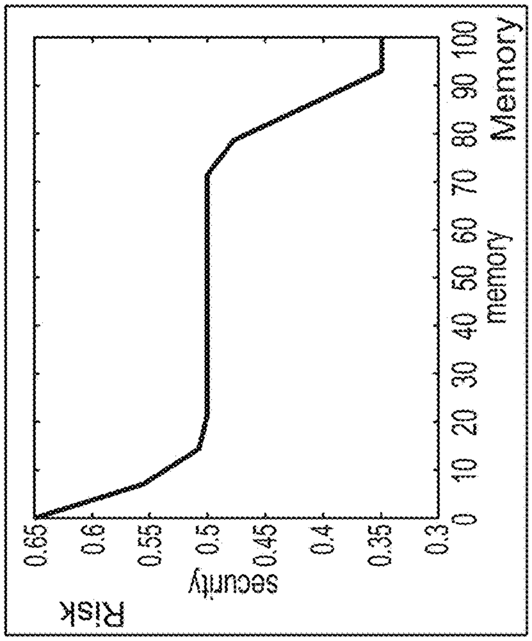
Figure 16C:
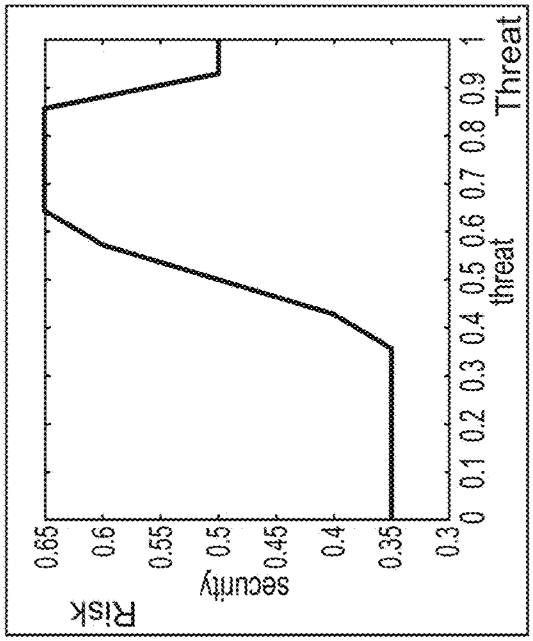
Figure 17B:
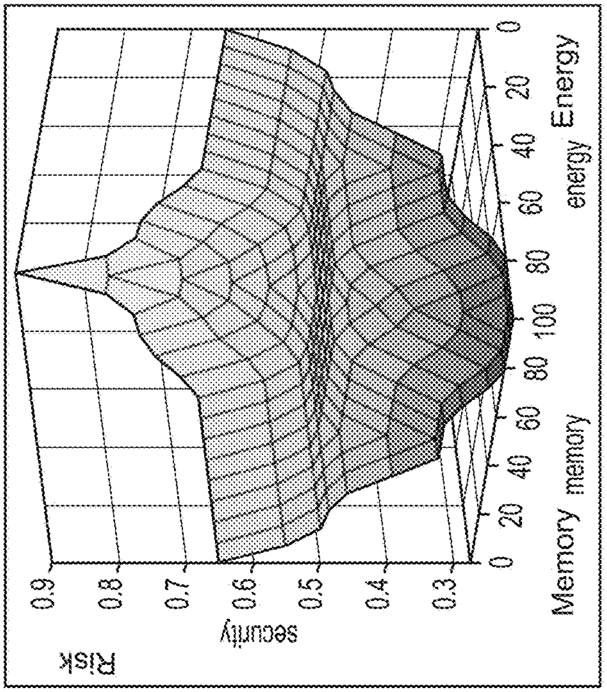
Figure 17A:
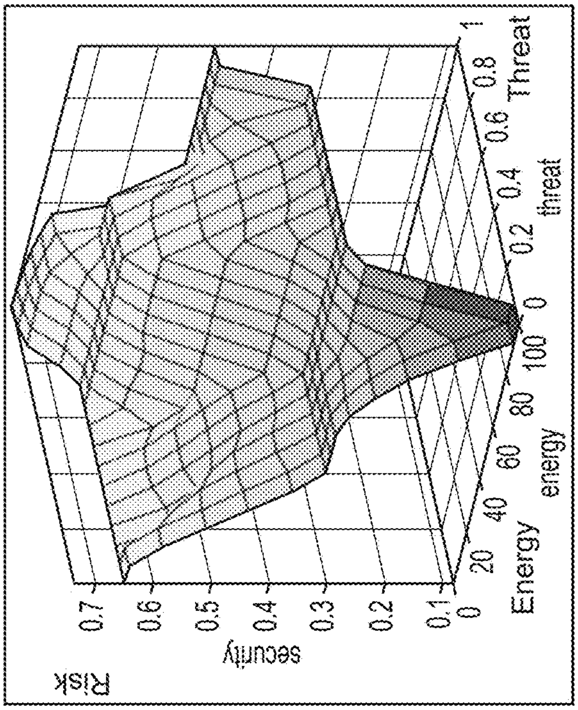
Figure 17C:
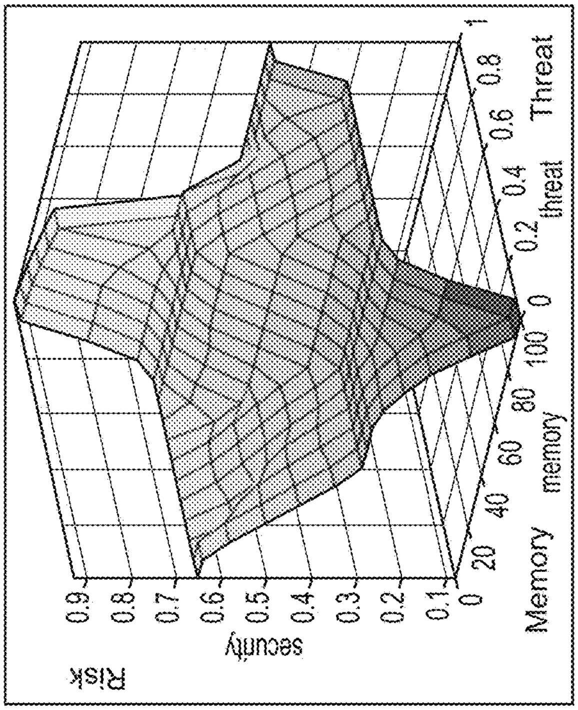
Figure 18:
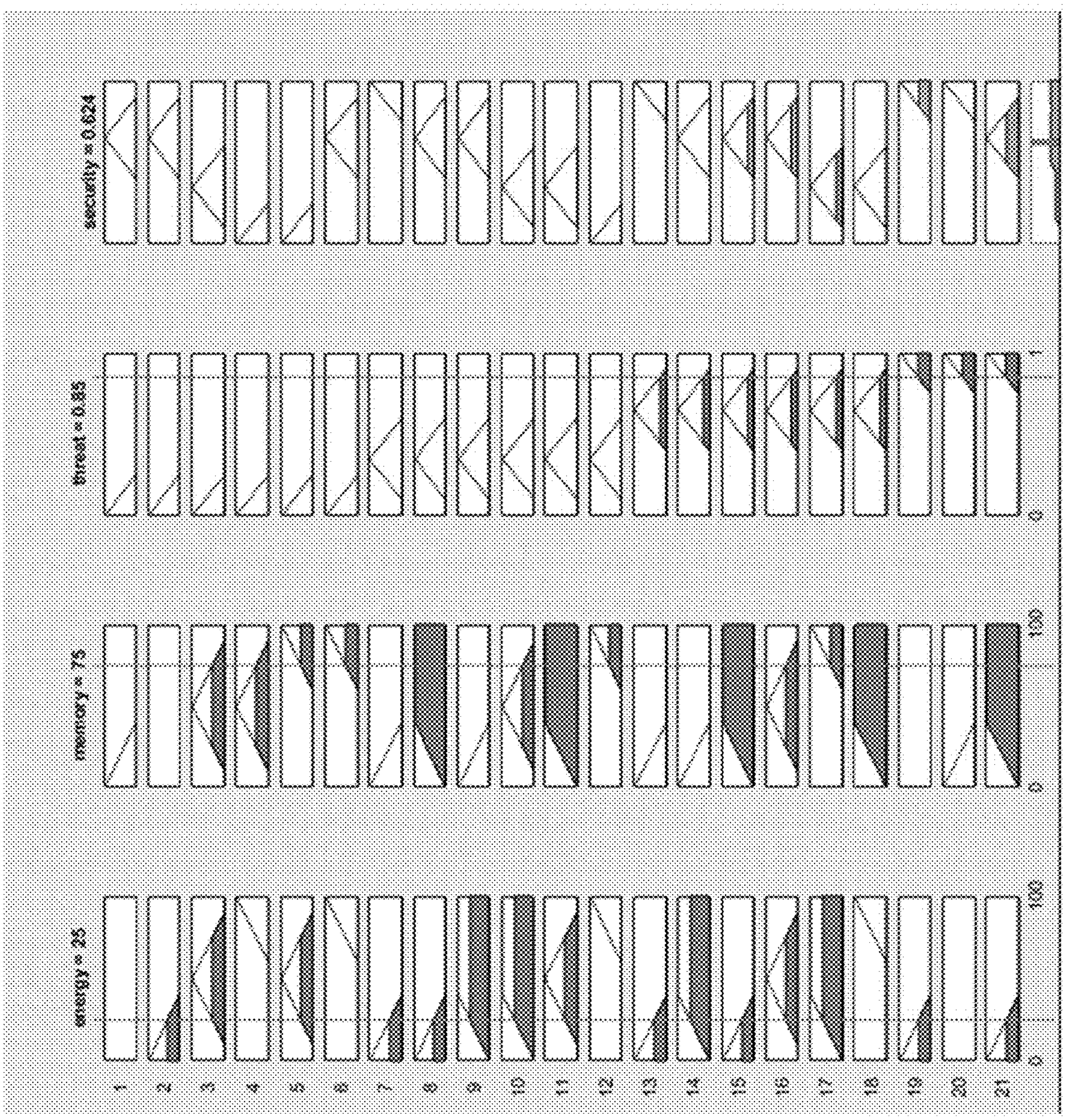
Figure 19:
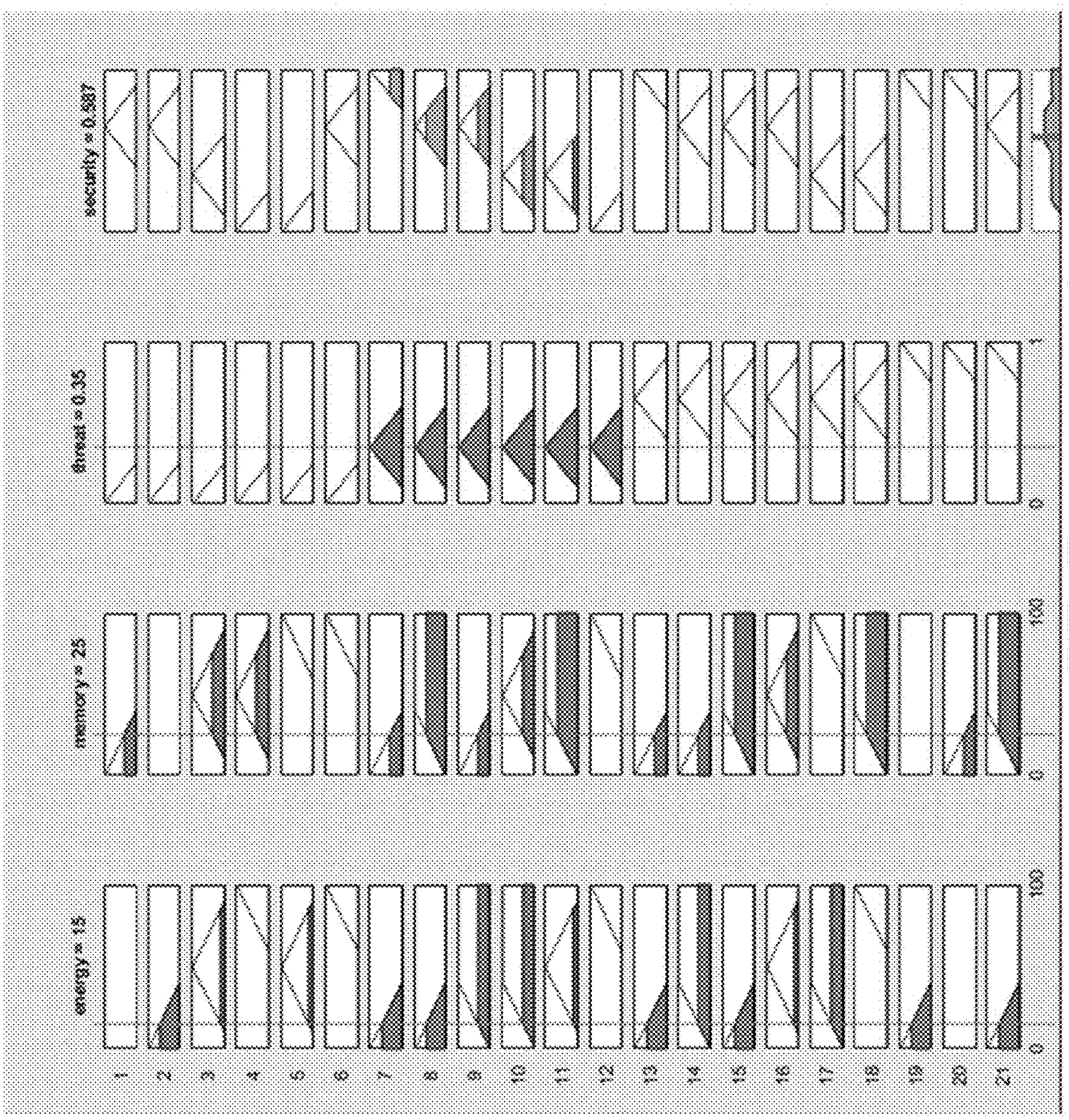
Figure 20:
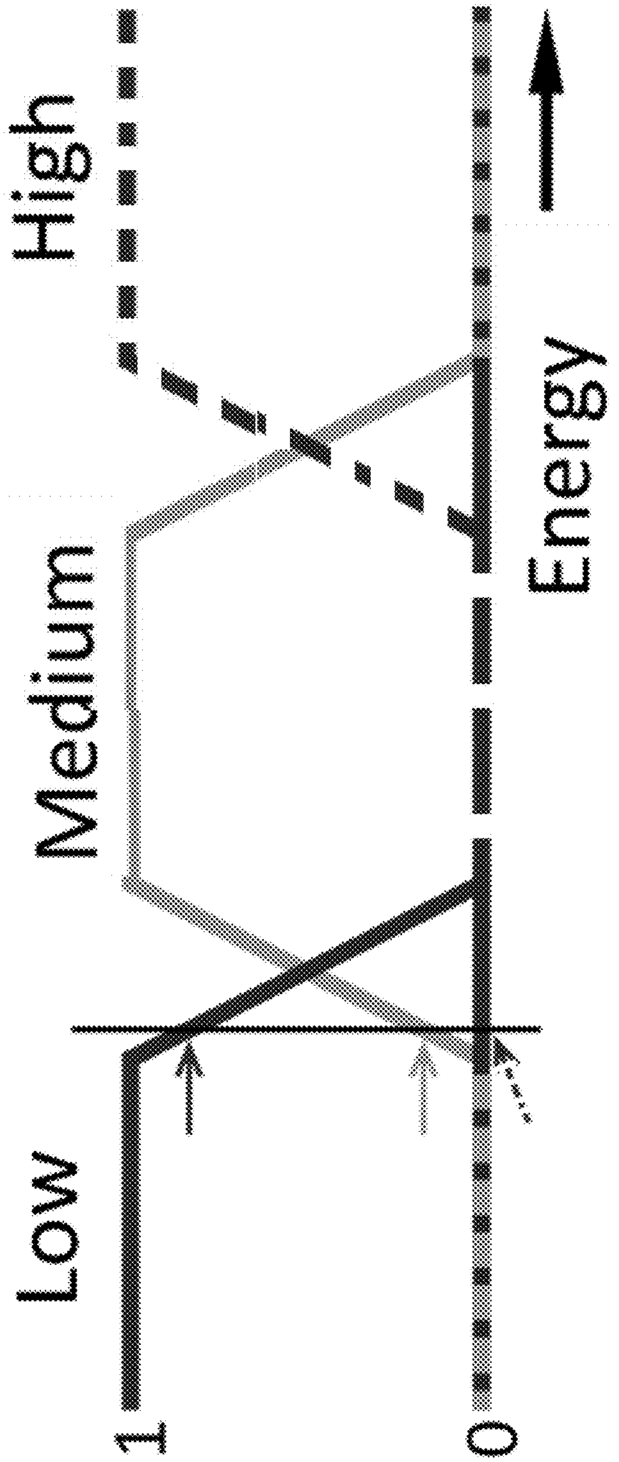

FIGS. 12(*a*)-12(*c*) are diagrams illustrating membership functions;

FIG. 13 is a diagram illustrating a table;

FIG. 14 is a diagram illustrating rules;

FIG. 15 is a diagram illustrating membership functions;

FIGS. 16A-16C are diagrams illustrating graphs useful for understanding embodiments;

FIGS. 17A-17C are diagrams illustrating graphs useful for understanding embodiments;

FIG. 18 is a diagram useful for understanding embodiments;

FIG. 19 is a diagram useful for understanding embodiments;

FIG. 20 is a diagram illustrating membership functions; and

Figure 21:
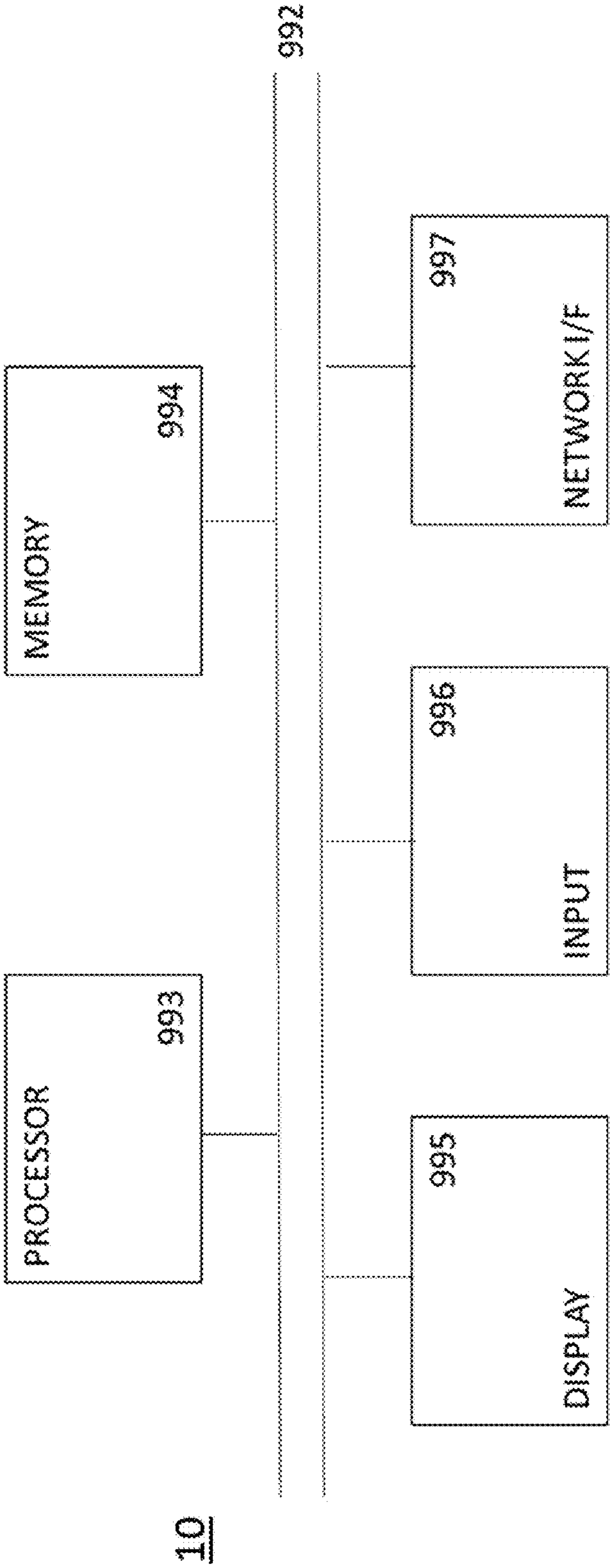

FIG. 21 is a diagram illustrating an apparatus.

The following definitions may be used in the description but are not exhaustive.

IoT: the acronym for "Internet of things" which describes physical objects (or groups of such objects) that are embedded with sensors, processing ability, software, and other technologies that connect and exchange data with other devices and systems over the Internet or other communications networks.

e-Health: refers to "electronic heath", an emerging healthcare practice supported by electronic processes and communication. This terminology covers a broad range of electronic/digital processes in the healthcare related domains. This also includes health applications and links on mobile phones, referred to as mHealth or m-Health.

Information Security Management System (ISMS) provides actionable sets of requirements, policies, guidelines, and process definitions to aid organizations in their quest to comply with their individual information security goals.

Information security risk management (ISRM): is an integral part of an information security management system. It defines the process of analysing what could happen and what the consequences might be, and helps organisations determine what should be done and when, to reduce risk to an acceptable level. Information security risk management is an iterative process to ensure that information security risks are systematically: (i) identified, (ii) analysed and (iii) treated in accordance with an organization's predefined local policy.

Vulnerability evaluation: refers to the assessment of the possible weaknesses in the system at hand. This would be achieved through a systematic review of internal security weaknesses and/or gaps in an information system and evaluating if the system is susceptible to any known vulnerabilities.

Threat assessment: While Vulnerability assessments focus on internal weaknesses that might undermine an organization's security, Threat assessments focus on external aspects, such as: neighbouring entities, tactics, and techniques that might be used to threaten an organization.

Risk management: Risk is a calculated assessment of both threats and vulnerabilities. A sound risk management strategy allows risks to be properly identified, fully analysed, and effectively mitigated. This process helps organizations understand not only the vulnerabilities that exist but the scale of the damage that could occur should they be exploited. Threat and vulnerability assessment are in general conducted under the umbrella of risk management in order to strengthen an organization's security.

Fuzzy Logic: an approach to computing based on "degrees of truth" rather than the usual "true or false" (1 or 0) Boolean logic. The concept of "Fuzzy set theory" was first introduced in the 1960s by Pr. Zadeh.

Fuzzy Inference System (FIS): is a logical system that implements a nonlinear mapping, using a Fuzzy Logic Engine, in order to derive outputs based on fuzzy reasoning using a set of fuzzy if-then rules.

Fuzzification: is the process of assigning the numerical input of a system (crisp values) to fuzzy sets with some degree of membership (truth value). This degree of membership may be anywhere within the interval [0,1]. If it is 0 then the value does not belong to the given fuzzy set, and if it is 1 then the value completely belongs within the fuzzy set. Any value between 0 and 1 represents the degree of uncertainty that the value belongs in the set. These fuzzy sets are typically described by words (linguistic variables), and so by assigning the system input to fuzzy sets, they may be manipulated and processed in a linguistically natural manner.

FIG. 20 is useful for understanding fuzzification. The linguistic variables low, medium, and high are represented by membership functions mapping an energy value to truth values of those membership functions. A value on x-axis has three "truth values"—one for each of the three membership functions. The vertical line in the image represents a particular value for energy that the three arrows (truth values) gauge. The energy value represented by the vertical line has 0 membership in the "high" fuzzy set (i.e. the truth value corresponding to the linguistic variable "high" is zero). The value has a truth value corresponding to the linguistic variable "medium" of approximately 0.2, and has a truth value corresponding to the linguistic variable "low" of approximately 0.8. This may be interpreted for example as: the energy value may be considered in the context of the "high" membership function as "not high"—i.e. this energy has zero membership in the fuzzy set "high"; the value may be considered in the context of the "medium" membership function as "slightly medium"; and the value may be considered in the context of the "low" membership function as "fairly low". The degree of membership (truth value) assigned for each fuzzy set is the result of fuzzification.

De-Fuzzification: is the process of producing a quantifiable result in crisp logic, given fuzzy sets and corresponding membership degrees. It is the process that maps a fuzzy set to a crisp set. Defuzzification is interpreting the membership degrees of the fuzzy sets into a specific decision or real value.

Proactive IoT security (meaning security policies (for example for IoT systems) which aim to take action before an attack rather than in response to an attack) is critical in our ever-connected world. While many businesses and leaders have identified this, the reality is currently different to the intention—there is a lack of effective security implementation techniques, for example for IoT systems. Furthermore, proactive IoT security will shape the IoT landscape, but there are barriers that need to be broken first. Encouraging IoT security adoption depends on generating awareness of IoT security benefits and making readily available efficient, scalable, and accessible IoT security frameworks. In short, IoT security needs to be democratized. The more businesses, large or small, that are able to operate and deliver in a secure framework, the quicker the IoT may reach its full potential. Making IoT security more accessible and increasing the awareness of IoT security benefits will drastically reduce the challenges that limit IoT security adoption.

Depending on the business in question there are numerous benefits for implementing an innovative, reliable, and adaptive security framework for IoT. Some are listed below:

- Fewer hacks and breaches: Ultimately, even the simplest of hacks and breaches may be disastrous. This highlights a key benefit of proactive IoT security, as it helps businesses avoid having to recover from disasters by preventing them in the first place.
- Early compliance with standards.
- Reducing financial damage and reduced cost of inaction: The average cost of a data breach in the UK is estimated at £3.36 million (https://www.statista.com/topics/2637/internet-of-things/)
- Reduced reputational damage and maintaining customer trust: In fact, more than half of customers stop buying from a brand that loses their trust.
- IoT security and business agility: There's now a growing expectation and regulatory requirement for security to be built into every product.

This disclosure considers using artificial intelligence technologies to optimise decision-making in order to secure IoT devices in a highly evolving, diverse and heterogeneous landscape. An objective is to improve security requirements through proactive security measures and optimised decision making.

Proactive security decision-making in an IoT environment is useful in order to protect: (i) the devices themselves, (ii) their interactions and (iii) their environment from malicious intruders, unauthorized users, and cyber-attacks. An adaptive security decision-making model may adjust to the dynamism of (i) Things (devices), (ii) their interactions, and (iii) the environment, and to the varying degrees of risk of the overall system being compromised. This may be achieved through dynamically determining whether changes and adaptations should be made to a security policy/level or not—and, if such changes/adaptations are to be made, to select the 'best' (most suitable) security model/policy for a given situation. Ideally, any changes/adaptations aim to achieve the greatest benefit for the smallest risk.

Part of the decision-making may include consideration of a trade-off between cost and security, that is between costly security measures and dynamically changing risk levels. An adaptive decision-making model may learn and adapt to an ever-changing IoT environment by: (i) combining adaptive risk-based decision models, adaptive security and privacy models, and actuators to make effective adaptive reaction, and (ii) integrating different metrics for validation and verification, adaptive risk assessment, and predictive analytics models for estimation and prediction of security and privacy risks and impacts.

This disclosure relates an adaptive security framework (a security level determination and application method, or an inference process for determining a security level), for example for IoT devices. Some challenges in addressing security issues may be considered to be (i) the limited computation, storage, and energy resources available (in a device), and (ii) the ever-changing circumstances affecting the overall threat of attack on a device (including internal and external factors).

In this disclosure the following matters are considered:

- A novel security framework for proactively protecting IoT assets by implementing suitable security measures depending on the context.
- Considering a highly ever-changing context, external aspects and internal capabilities are continuously assessed and evaluated in order to select the most appropriate input for the next steps.
- A new Fuzzy Inference System is designed for risk management. It uses the changes in context as inputs to decide on the security risk levels as output.
- Risk levels are defined through specific security measures.
- An example application in e-Health.

Figure 1:
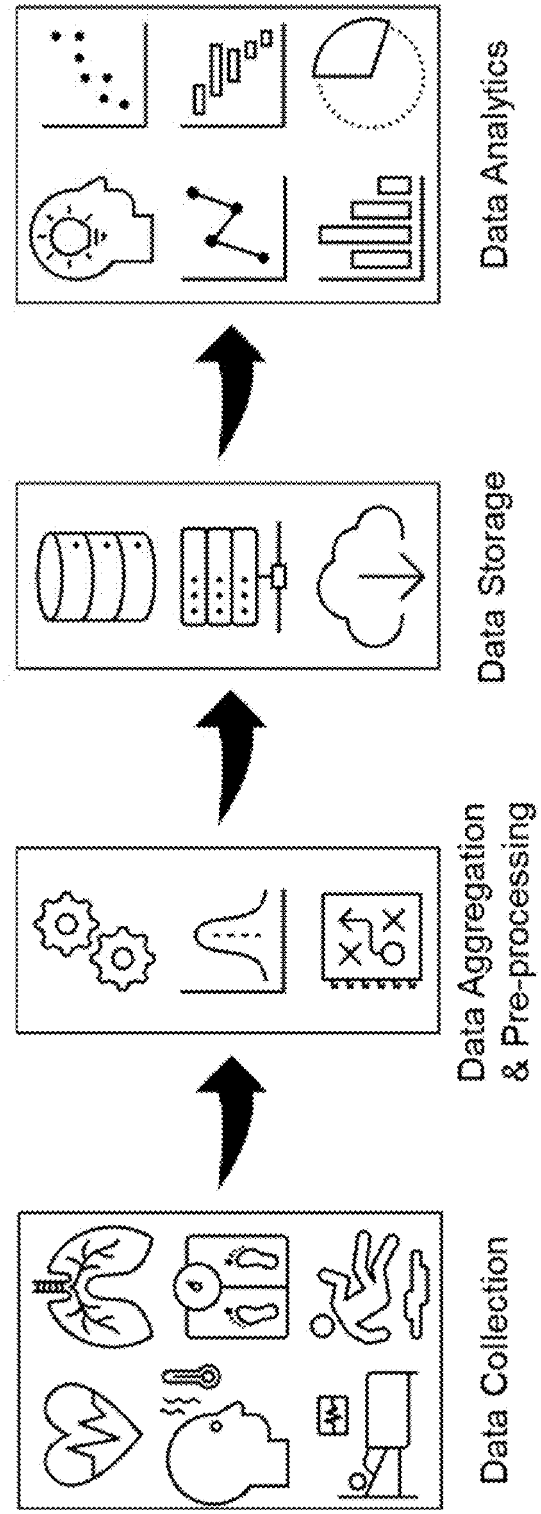
FIG. 1 is a diagram useful for understanding IoT environments.

In order to design a security framework for an IoT application, it is useful to fully understand the underlying architecture and the possible interactions between the possible entities within. A well-established IoT Architecture covers four specific stages to deliver a specific service. FIG. 1 shows a synoptic view of the four facets that need to be covered as part of an IoT environment. Chronologically, the processes involved are as follows:

1. Data Collection: This involves the deployment of interconnected and/or communicating devices that include sensors, actuators, monitors, detectors, camera systems etc. These devices collect the data.
2. Data Aggregation & Pre-processing: Previously collected Data, originating from different sources, would usually need to be cleaned, aggregated, and converted into usable data format for future operations.
3. Data Storage: In this stage, previously pre-processed data would be standardized, compressed, if needed, and prepared to be moved into specific data centres and/or Cloud storage.
4. Data Analytics: Data in this final stage may be managed and analysed at the required level. Advanced Analytic tools would be applied in order to reveal actionable business insights for effective decision-making.

Application of IoT in e-Health

IoT-based technologies have significant applications in e-Health and have the potential to revolutionize the delivery of healthcare services. IoT devices may collect, process, and transmit continuously healthcare data thereby reducing the cost of patient monitoring and improving the quality of healthcare services. IoT powered e-Health solutions connect information, people, devices, processes, and context to improve outcomes. The intelligent devices, which may be now seamlessly interconnected, may indeed provide a great value for healthcare providers. Furthermore, the collected medical information may be used to make actionable decisions based on algorithms and evidence-based models and may significantly impact how healthcare may be supervised, controlled, managed, and delivered. Harnessing the power of IoT for e-Health may generate more opportunities for improving many areas in healthcare systems. Some of the most promising use cases include: (i) preventive healthcare, (ii) proactive monitoring, (iii) follow-up care and (iv) chronic care disease management.

Figure 2:
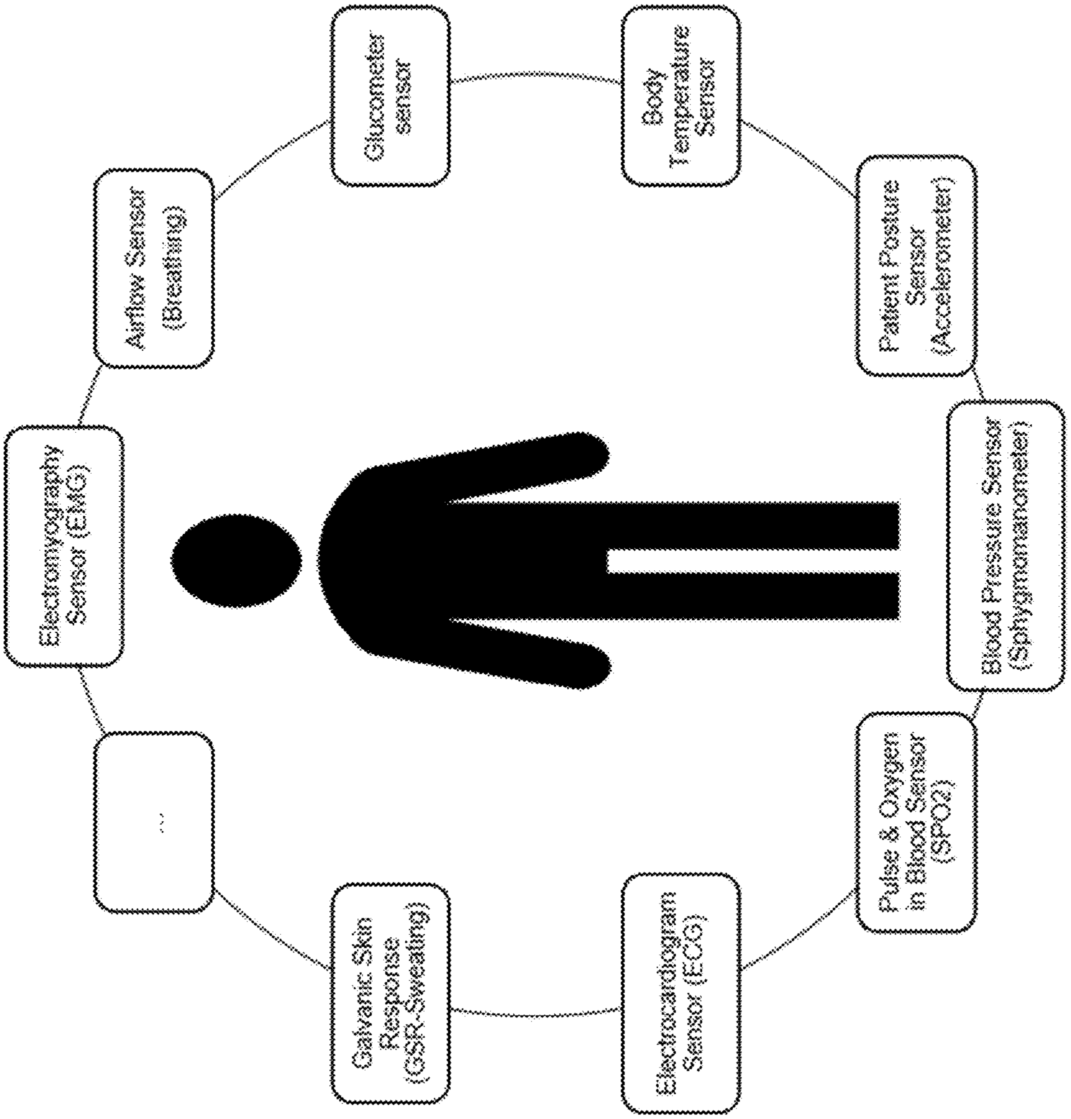
FIG. 2 is a diagram useful for understanding e-health IoT environments.

FIG. 2 illustrates possible devices (corporal detection devices) which may be used in an e-Health IoT system. The corporal detection devices in networks, together with sensors in our life environment, allow the continuous and real-time collection of an individual's health information and their related behaviour. Captured in a continuous and aggregated manner, this information may be exploited to allow monitoring, treatments, and interventions in real-time. The healthcare industry remains one of fastest to adopt the IoT. The main reason for this trend is that the integration of IoT functions in medical devices greatly improves the quality and effectiveness of medical service, providing an especially high value for patients with chronic conditions. Bionics, for example, is improved by IoT sensors for the collection of patient data from around the world and big data analysis is used to efficiently diagnose different types of diseases. However, this all starts with the IoT sensors themselves. Thanks to the latest advancement in miniaturisation of integrated circuitry, a wide range of sensors may now be used as part of a wireless Body area network.

The possible devices shown in FIG. 2 range from a simple Oximeter & pulse sensor to more sophisticated electromyography sensors. Such sensors may collect data related to heart activity (K. Venugopal, A. Kumar, "Centralized heart rate monitoring and automated message alert system using WBAN", International Journal of Scientific and Research Publications, Vol. 3, no 9, September 2013), blood pressure (B. Yuvaradni et al, "Health Monitoring Services Using Wireless Body Area Network", Imperial Journal of Interdisciplinary Research (IJIR), Vol. 2, no. 5. Pp. 1648-1651, 2016) and glucose level (Rasyid, F. et al, "Implementation of blood glucose levels monitoring system based on Wireless Body Area Network", 2016 IEEE International Conference on Consumer Electronics-Taiwan (ICCE-TW), Nantou, pp. 1-2, 2016).

Figure 3:
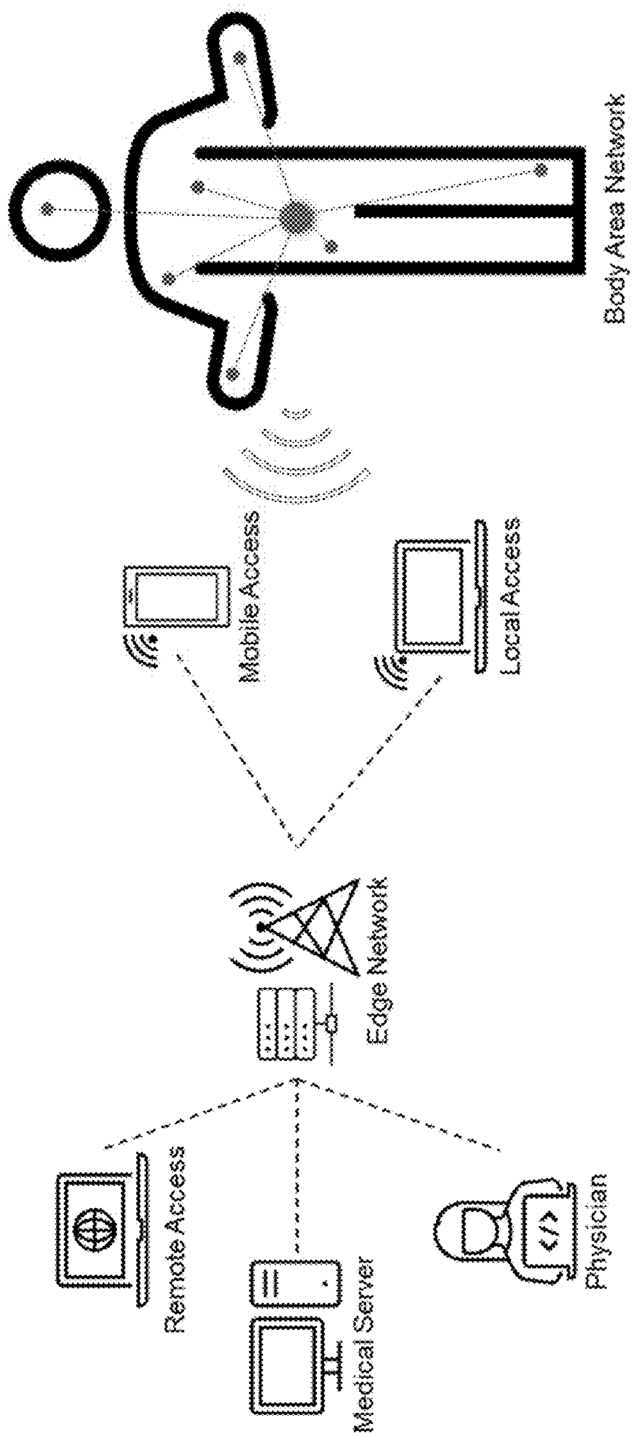
FIG. 3 is a diagram useful for understanding e-health IoT environments.

The need to monitor the vital signals of the human body for the early diagnosis of diseases has led to the emergence of wireless body area networks (WBAN) for E-Health. FIG. 3 illustrates a WBAN connecting to other networks. This emerging interdisciplinary domain would allow inexpensive and continuous health monitoring with real-time updates of medical records through the Internet. WBAN connects independent nodes (e.g. sensors and actuators) that are situated in the clothes, on the body or under the skin of a person. The network typically expands over the whole human body and the nodes are connected through a wireless communication channel. WBAN helps in monitoring vital signs of a patient and may monitor patient's history in routine life activities to provide them accurate treatment. Doctors may check the complete details of patients from a remote location and may recommend a suitable medication and/or treatment.

In the FIG. 3 system, the embedded sensors in the human body gather different physiological data about the patient's health. The collected data is then wirelessly transmitted to external nearby units which transmit the received data to distant devices for further operations (long term storage, thorough analytics, etc.).

The Need for Adaptive Security as a Solution for Security Issues in IoT for e-Health Given the highly sensitive nature of the data collected in e-Health settings, cyber security receives the topmost priority. As such, stakeholders need to make sure that the patient data is reliable and only derived from each patient's dedicated sensors and is not mixed up with other patients' data. Furthermore, on the one hand, the collected data should have secure and limited access. On the other hand, because of the constrained nature of most IoT devices in terms of (i) power, (ii) memory, (iii) communication rate and (iv) computational capability, security solutions proposed for other types of networks may not be easily applicable. In order to achieve the basic security requirements, in terms of Confidentiality, Authentication, Integrity, and Availability, suitable security measures need to be implemented while taking into account the limitation of IoT devices.

In the context of e-Health, strong privacy and security concerns are associated with the use of IoT devices which may tend to be vulnerable to attacks. Since communication in IoT systems is mainly wireless, eavesdropping attacks represent a real threat. Also, IoT devices are usually unattended and thus vulnerable to physical attacks. Furthermore, most IoT devices have limited energy, storage, and computation capabilities, limiting their ability to implement complex security models onboard.

Challenges and Inefficiencies in Current Models

Unlike reactive security that focuses on threats that have already found their way into a network, proactive security prevents attacks from happening in the first place. Specifically, proactive security improves a cyber security stance by correcting vulnerabilities that make a system susceptible to cyber-attacks before cybercriminals exploit them to get into the network and/or undermine the overall system.

On one hand, implementing state-of-the-art high security measures may be resource intensive, especially for constrained devices. As a consequence, this would:

a) Result in lower performances in the devices and an increased latency (quality of service—QoS).
b) Lead to high resource utilisation in terms of: Computation, Communication, Storage and Energy.
c) Incur considerable budgetary investments.

On the other hand, lowering security requirements (to alleviate the problems a-c above) is risky and strongly controversial. The lack of effective/suitable security measures may lead to:

a) Increased exposure to risk.
b) Missed business opportunities
c) Ineffective policy implementation
d) Poor reuse of security investment Furthermore, security requirements are highly correlated with context. At the same time, context is highly volatile and ever changing. Specifically, context may be defined through:

a) Vulnerabilities (internal aspects)—Local (software & hardware) assets availability: refers to the assessment of the possible weaknesses in the system/device at hand. This would be achieved through a systematic review of internal security weaknesses and/or gaps in an information system and evaluating if the system is susceptible to any known vulnerabilities.
b) Threats (external aspects)—Environment settings: While Vulnerability assessments focus on internal weaknesses that might undermine an organization's security, Threat assessments focus on external aspects, such as: neighbouring entities, tactics, and techniques that might be used to threaten an organization.

In order to address all the previous points, this disclosure presents a new risk-based adaptive security method to evaluate a new risk measure and determine the most appropriate countermeasure associated with the estimated risk value. The newly proposed risk management strategy considers both: (i) external threats and (ii) internal vulnerabilities. This strategy allows for security risks to be properly identified, fully analysed, and effectively mitigated. This disclosure would help stakeholders from different organizations to better understand not only the vulnerabilities that might exist but also the scale of the damage that could occur should they be exploited. Threat and vulnerability assessment may be conducted under the umbrella of the disclosed adaptive security management framework in order to strengthen security.

The disclosed methods, apparatuses, and programs may be employed in any system, for example an IoT system. The disclosed methods, apparatuses, and programs may be employed in an e-Health IoT setting. This disclosure highlights the benefits that a fuzzy-based adaptive security measure may yield for such highly constrained systems with very limited resources. This disclosure may be considered as addressing the challenge of finding the right trade-off between security measures and performance while taking the available resources into consideration. Compared to currently existing tools, the approaches disclosed herein adapt in real time to changes in context (internal and external). Prior art adaptive security tools are either: (i) implemented offline and manually triggered by a human operator, and/or (ii) applied reactively following a proven exposure to a specific and/or a well-known threat.

Figure 4:
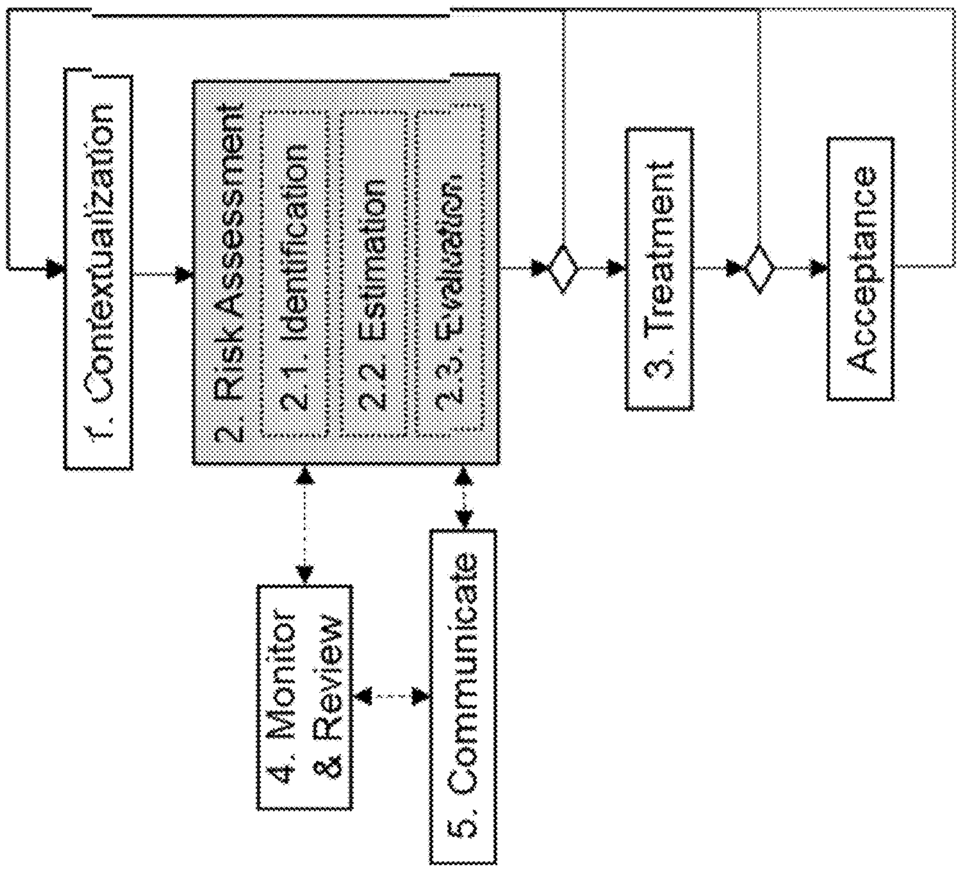
FIG. 4 is a diagram useful for understanding embodiments.
Figure 5:
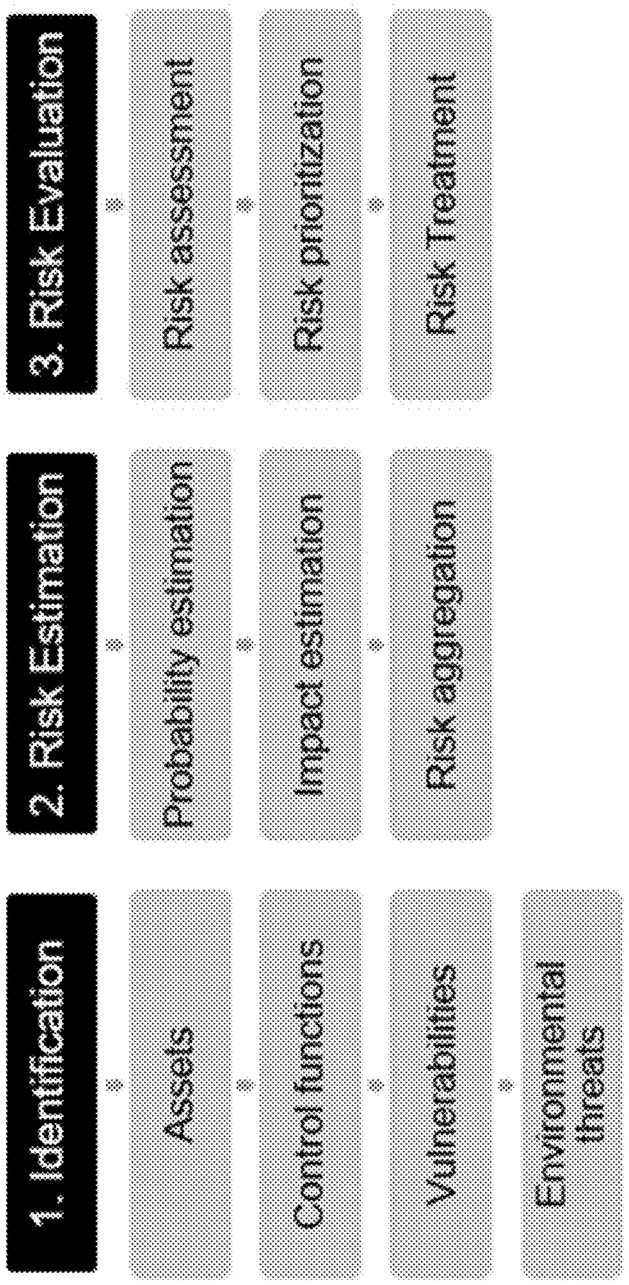
FIG. 5 is a diagram useful for understanding embodiments.

Information Security Risk Management (ISRM) is integral to information security management. It is the process of analysing what could happen and what the consequences might be, and helps organisations determine what should be done and when to reduce risk to an acceptable level. Information security risk is defined as "potential that a given threat will exploit vulnerabilities of an asset or group of assets and thereby cause harm to the organization" (ISO, 2011. ISO/IEC 27005: Information technology—Security Techniques—Information security risk management, ISO/IEC Standard 27005:2011, International Organization for Standardization). A general approach to systematically manage information security risks is outlined in the ISO 27005 standard. The same basic building blocks and processes may be universally identified in nearly all ISRM standards, best practices and many other information security frameworks or risk management approaches. FIG. 4 illustrates this general approach to systematically manage information security risks, which generally includes five different activities where (1) context establishment is followed by (2) risk assessment, with (3) risk treatment (and possibly acceptance of residual risks) concluding each iteration. Risks are further continuously (4) monitored and reviewed and (5) communicated within organizations. A focus of this disclosure is on Risk assessment, which as shown in FIG. 4, may be considered to include three main steps: (i) risk identification, (ii) Risk estimation, and (iii) risk evaluation. A more detailed view of what each of these three steps may comprise is illustrated in FIG. 5.

This disclosure is directed to designing and implementing an adaptive security framework, for example for IoT devices. A challenge in addressing the security issues may be the combination of: (i) the limited, computation, storage and energy, resources available, and (ii) the ever-changing specifications (internal and externals). This description includes the following points:

1. A novel security framework for proactively protecting IoT assets by implementing suitable security measures depending on the context is described.
2. Considering a highly ever-changing context, external aspects and internal capabilities may be continuously assessed and evaluated in order to select the most appropriate input for the next steps.
3. A new Fuzzy Inference System is described for risk management. It uses the changes in context as inputs to decide on the security risk levels as output.
4. Risk levels are defined through specific security measures.
5. An example in an e-Health application is described.

Fuzzy logic is considered one of the most used techniques to design sophisticated decision-making systems. This is mostly due to its resemblance to the human cognitive process while being able to generate precise solutions from uncertain or imprecise inputs. Fuzzy Inference Systems fit in-between purely mathematical approaches and purely logic-based approaches (S. N. Sivanandam et al., Introduction to Fuzzy Logic using MATLAB, Vol. 1, Springer, Berlin, 2007). While classical reasoning approaches require precise equations to model real-world behaviours, fuzzy based systems are able to handle input data ambiguities. Being inspired by the human decision-making process, fuzzy logic offers an intuitive scheme to represent a problem in linguistic variables, and subsequently, carry out the reasoning process through an inference engine powered by an if-else style rules base. Choosing appropriate values for risk as part of a risk assessment process is a challenging task. That is, bearing in mind the diverse nature for the inputs (internal vulnerabilities and external threats), computing such a parameter is challenging.

Figure 6A:
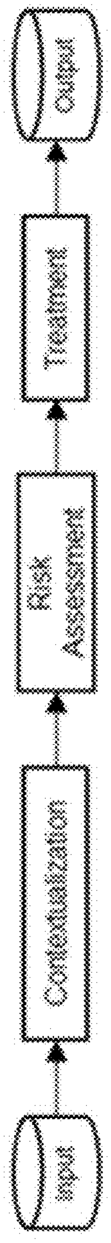
FIGS. 6A and 6B are diagrams useful for understanding embodiments.
Figure 6B:
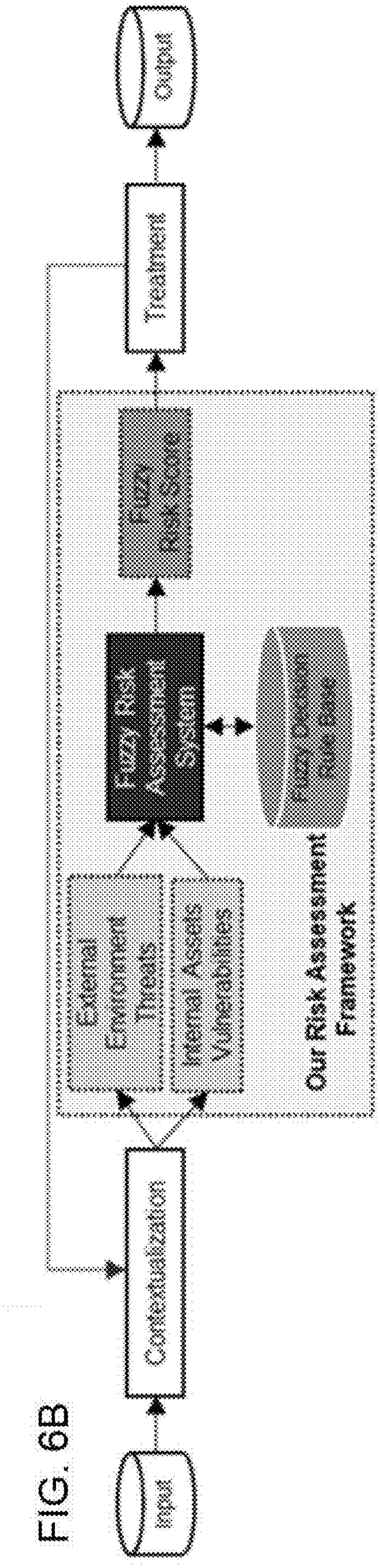

FIGS. 6A and 6B illustrate a general security framework FIG. 6A and the framework disclosed herein in that context FIG. 6B. As disclosed herein, fuzzy logic is used for finding the right values for Risk assessment. The choice to use fuzzy logic is not arbitrary—on the contrary, it is justified by the many advantages that fuzzy-based approaches have over conventional techniques, such as its relatively simple mathematical concepts and tolerance to imprecise data. Other benefits include flexibility and the intuitiveness behind the fuzzy-based approach's cognitive process. A further benefit is that fuzzy inference systems are lightweight computation-wise. This may be particularly advantageous for constrained devices with limited resources, e.g. devices in (e-Health) IoT systems.

The methods disclosed herein may be implemented within each IoT device individually for determining and applying a security level. The methods include an inference process for determining a security level which may be implemented as follows, among other ways:

i. The inference process may be triggered on a regular interval of time (each 1 or 2 hours, for instance). In other words, the inference process may be performed when a threshold amount of time has expired since the most recent occurrence of performing the inference process. Only a simple timer may be used to control the triggering of the inference process.

ii. The inference process may be triggered as a response to a change in either external or internal dynamics. In other words, the inference process may be performed when, for any of a plurality of measurements (described below), the value of the measurement passes a trigger threshold value, or when, for any of the measurements, a difference between a current value and a value used in the most recent occurrence of the inference process is above a threshold change amount. In this case, the IoT device would monitor the one or more parameters (measurements) that may be used to initiate the process. Examples for such criteria include a resource usage reaching a prespecified threshold (energy below ~20%, storage usage more than ~85%, . . . ), or a change in location (e.g. detected by a new position). The inference process may also be performed when connection with a new device is detected.

Figure 7:
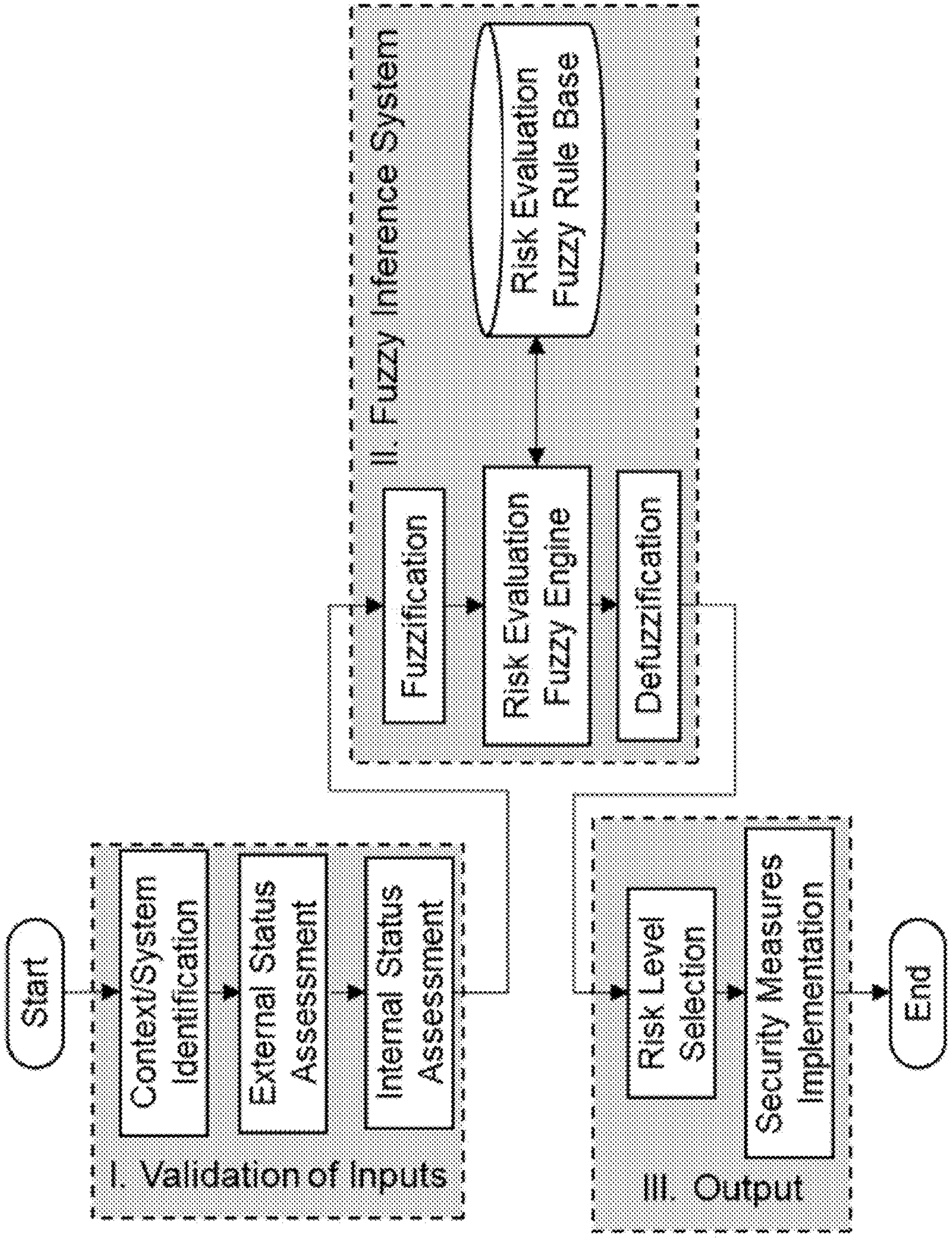
FIG. 7 is a diagram illustrating an overview of some embodiments.

FIG. 7 provides an overview (specifically, a 3-layered view) of the disclosed methodology. The methodology comprises phase I: validation of inputs, phase II: fuzzy inference system, and phase III: output. Phase I comprises receiving inputs upon which the fuzzy inference will be based. The inputs may include internal and external inputs. This phase may comprise classifying the inputs as internal or external. Internal inputs define Internal Vulnerabilities, whereas external inputs (the inputs covering external aspects), related to the device's environment or any other external factors, for instance, are taken into account when assessing external Threats.

Phase II comprises fuzzification, processing of a risk engine (risk evaluation fuzzy engine) which uses fuzzy logic, and defuzzification. These aspects will be described later. In phase II both Internal Vulnerabilities and External Threats may be combined to decide on an overall Risk value.

Phase III comprises risk/security level selection and implementation of the corresponding security measures. That is, the risk value is used to decide on the most suitable (cyber) security measure(s) to be implemented in order to protect the device.

Figure 8:
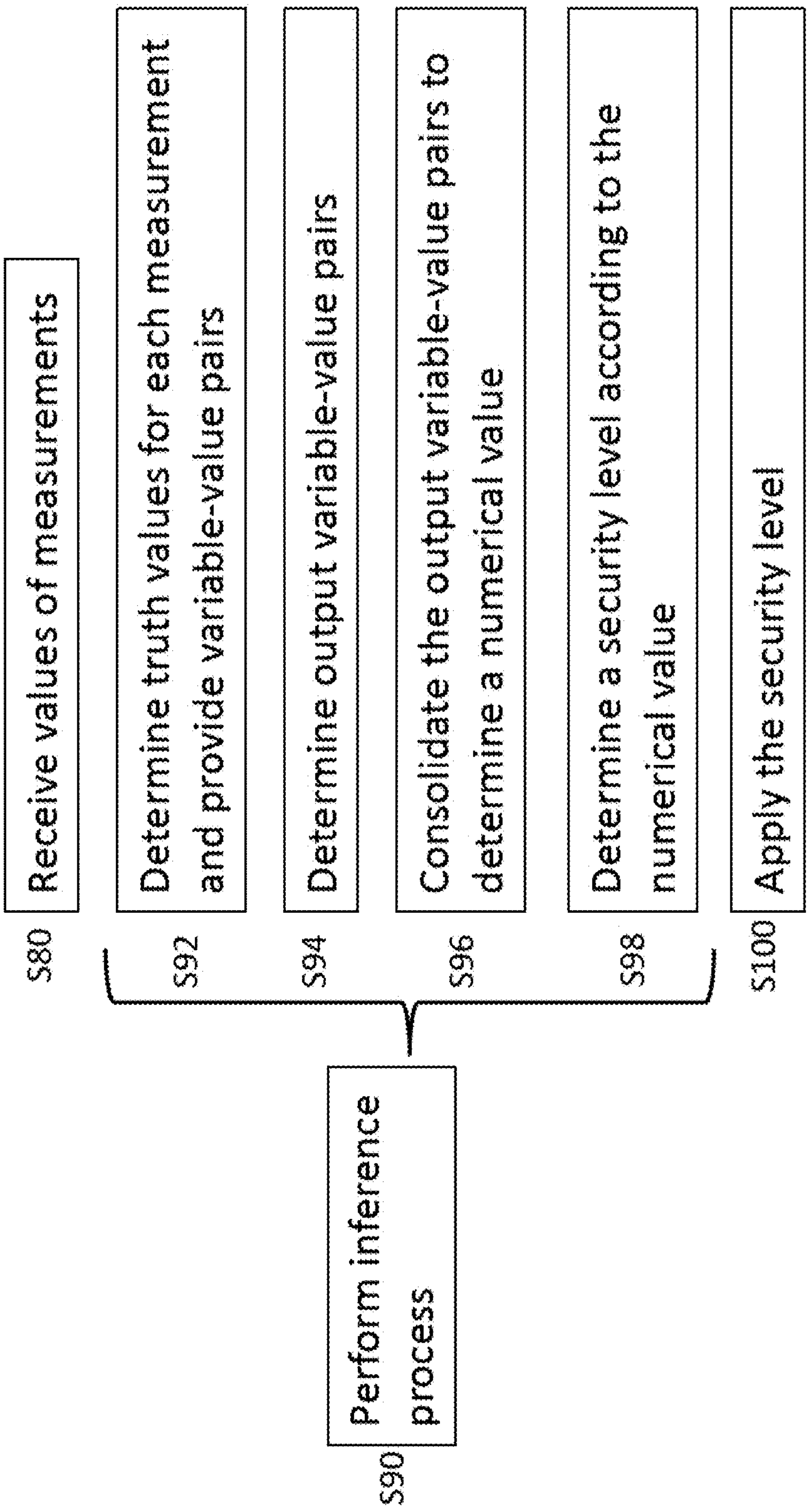
FIG. 8 is a diagram illustrating a method.

FIG. 8 illustrates a method of implementing (determining and applying) a security level/policy for a device.

Step S80 comprises receiving a value for each of a plurality of measurements. The measurements represent at least two of

- an energy level of a battery in the device (or a remaining energy level);
- an available memory of a processor in the device (i.e. available storage space);
- a clock speed of the processor in the device;
- a bandwidth of a communication channel of the device (i.e. a communication channel of the device with another device with which the device is configured to communicate);
- a distance between the device and the other device with which the device is configured to communicate;
- a frequency of movement of the device (i.e. how many times in a particular period of time the device moves more than a threshold distance); and
- a received signal strength indication, RSSI, of a signal from the other device with which the device is configured to communicate.

The measurements may be representative of other quantities/parameters as well or instead of those above.

Step S90 comprises performing an inference process to determine a security level for the device, and step S100 comprises applying the determined security level (i.e. transmitting (and receiving) communications with the other device according to the determined security level).

Step S90 may be considered a fuzzy inference process and comprises steps S92-S98.

Step S92 comprises, for each measurement, using a plurality of membership functions provided for the measurement to determine a plurality of truth values, respectively, and providing for each measurement a plurality of variable-value pairs each comprising a linguistic variable and a corresponding determined truth value. A plurality of membership functions is provided for each measurement and correspond respectively to a plurality of linguistic variables for describing the magnitude of the measurement's value. The linguistic variables may be considered "fuzzy sets", the membership function defining a mapping between a value and a degree of membership (truth value) of that value in each fuzzy set. Each membership function defines a mapping between the measurement's value and a truth value indicative of how well the measurement's value is described by the corresponding linguistic variable. For example, a measurement's value may be described as the linguistic variables "low", "medium", or "high". For this measurement, the membership functions include three membership functions: one for "low", one for "medium", and one for "high". The membership function corresponding to the linguistic variable "low" defines a mapping between a given value of the measurement and a truth value indicative of how well the linguistic variable "low" describes the given value. Examples of membership functions will be described later.

Step S94 comprises determining a plurality of output variable-value pairs. The output variable-value pairs correspond respectively to a plurality of variable-value pair combinations each comprising one determined variable-value pair per each of the plurality of measurements. Each variable-value pair for a given measurement may be combined with every variable-value pair for every other measurement to provide the combinations. If there are N measurements n1, n2, n3, . . . nN, and the measurements have the following numbers of possible linguistic variables: m1 for measurement n1, m2 for measurement n2, etc., then the number of possible combinations is m1*m2 . . . *mN.

Each output variable-value pair comprises one of a plurality of risk linguistic variables for describing the magnitude of risk of attack on the device and a risk truth value. For each output variable-value pair the risk linguistic variable is determined based on the linguistic variables of the corresponding variable-value pair combination and using rules defining mappings between the risk linguistic variables and combinations of linguistic variables of the measurements. The rules may be if-else rules. For example, one rule may define that if measurement n1 has the variable "low" and if measurement n2 has the variable "medium", then the risk linguistic variable for that combination is "low".

For each output variable-value pair the risk truth value is determined based on the truth values of the corresponding variable-value pair combination and using at least one formula (or "rule"—though this is not part of the rules illustrated in e.g. FIGS. 13 and 14) defining a mathematical combination of the truth values (i.e. a formula/rule defining how to combine said truth values to determine a said risk truth value).

The rules used to determine the risk linguistic variable (i.e. the rules illustrated in FIGS. 13 and 14) may have different weights which may be used when determining the risk linguistic variables based on the linguistic variables (representing the measurements) and the rules. For example, a first rule could have a higher weight than a second rule and therefore the particular combination of linguistic variables prescribed by the first rule could have more of an impact on the risk linguistic variable than the combination of linguistic variables prescribed by the second rule.

Step S96 comprises consolidating/aggregating the plurality of output variable-value pairs to determine a numerical value representing the risk of attack on the device (the risk level). This value may also indicate the device's capability to implement security levels. This may be performed according to procedures or "rules" (though not part of the rules illustrated in e.g. FIGS. 13 and 14) defining how to consolidate output variable-value pairs. Step S96 may involve the use of membership functions for the risk linguistic variables.

Steps S94 and S96 may be carried out in a number of different ways. Some examples are described in https://en.wikipedia.org/wiki/Defuzzification, https://nl.mathworks.com/products/fuzzy-logic.html?requestedDomain=, and https://nl.mathworks.com/help/fuzzy/fuzzy-inference-process.html, though not exhaustively. In particular, for example, the center of gravity (COG) method may be used in step S96. Steps S94 and S96 may be combined together in a single step/process.

Step S98 comprises determining the security level to apply according to the determined numerical value indicating the risk of attack on the device. Ranges of the numerical value may correspond to security levels. Step S98 may comprise determining to apply a first security level when the determined numerical value is below a first threshold and determining to apply a second security level, which may have higher (and e.g. more resource-intensive) security requirements than the first security level, when the numerical value is above a second threshold.

The method may be considered a method of implementing a security level for communication between the device and another device. The method may be carried out for a plurality of "other devices". That is, the disclosure provides a method of implementing a plurality of security levels for communication between a device and a plurality of other devices, respectively, comprising performing the method described above for communication with each other device.

If only limited resources (memory, energy, bandwidth, etc (these may be considered internal vulnerabilities/inputs)) are available, a device is more vulnerable to attacks. One of the widely used attacks are of the DOS type (denial of service) which try to exhaust the available resources (whether it is memory (flooding with messages/events that need to be saved and/or transmitted), energy (for computation and/or communication), bandwidth (flooding the available channels with noise and/or packets, etc)) to make a device unable to counteract an attack.

The following measurements may affect a device's risk of attack:

(i) Distance to Base Station (i.e. the other device with which the device is communicating) may be a relevant factor for identifying the external risk. Since an IoT device cannot control this distance, it is therefore considered an external factor. Moreover, the smaller this distance the lesser the threats, and the longer the distance the bigger the threats. The wireless transmission used by the IoT device would face less threat of being intercepted and/or tempered with if the device is closer to its base station.

(ii) Mobility model: this second example refers to the frequency with which the device moves, its speed, direction of movement, etc. Depending on the context, a static/fixed device in a secured environment would have low risk compared to a frequently moving device. Mobility model covers changes not only in positions, but also speed and frequency (regular changes or variable).

(iii) RSSI (Received signal strength indication) is a network measurement of the power present in a received radio signal. RSSI indicates how well a given device can hear a signal from an access point or router. It is a value that is useful for determining if a device has "enough signal" to get a good wireless connection. Furthermore, even though its values may be pulled from the device's network card, it is not necessarily the same as the transmit power from a router or AP (access point). Therefore, it is useful in indicating the quality of the underlying network (environment). RSSI may be invisible to a user of a receiving device, but because signal strength may vary greatly and directly affect functionality in wireless networking, RSSI may be used as an indicator for detecting attacks, i.e. the RSSI may affect the risk of attack.

Other/alternative measurements for determining a security level may include any other measure of communication quality between the device and the other device communicating with the device (e.g. base station).

Furthermore, a device in an indoor environment may be considered more secure than a device in an outdoor environment. Moreover, hospitals usefully follow restricted access policies for security reasons, hygienic and infection risks considerations, and for the privacy of the patients and their families. So, a hospital may be considered more secure than an outdoor setting. On the other hand, device's in a hospital may handle sensitive information about a patient's wellbeing. This makes a hospital environment particular.

The location of the device therefore may be taken into account when designing an adaptive security approach. That is, the location/environment of the device (e.g. indoor, outdoors, hospital) may be a measurement used to determine the security level.

Figure 9:
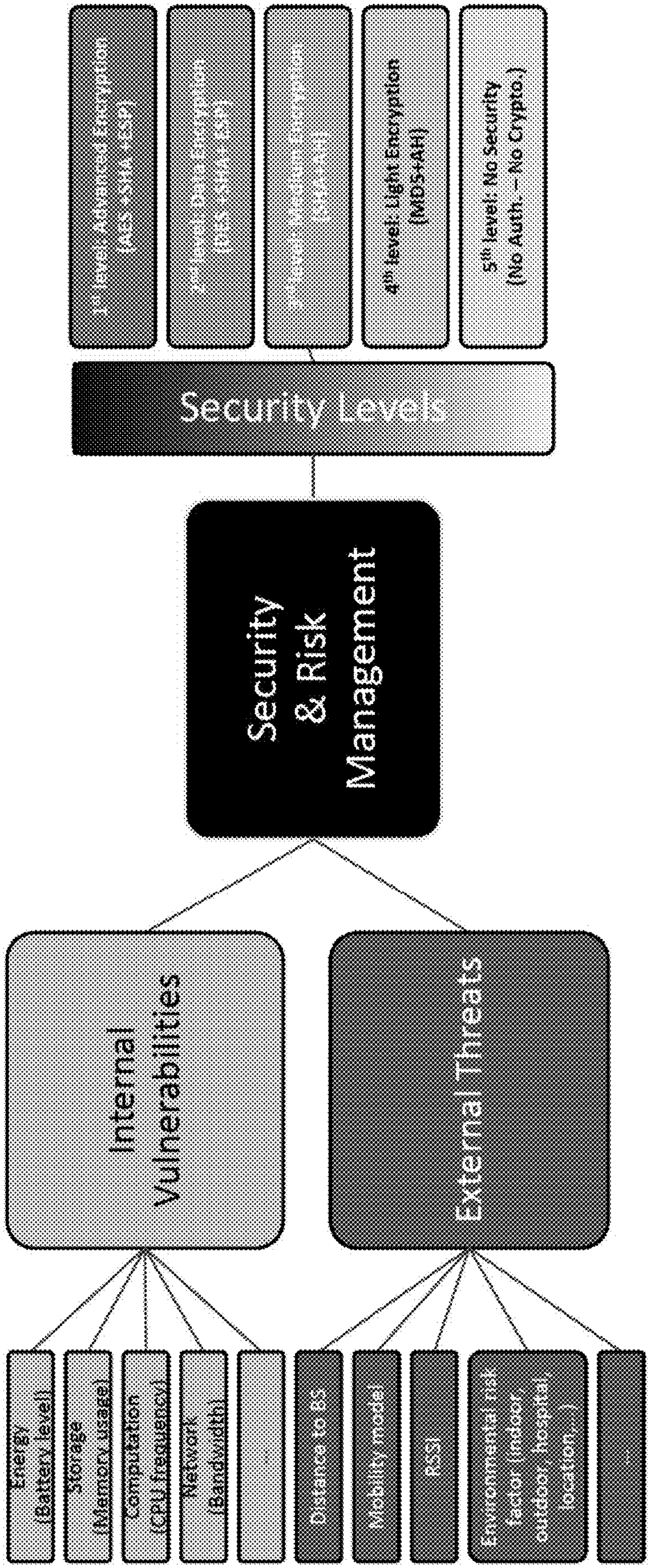
FIG. 9 is a diagram useful for understanding embodiments.

FIG. 9 illustrates an overview of the disclosed methodology. FIG. 9 shows internal and external inputs (internal vulnerabilities and external threats). The method may comprise receiving only internal inputs or only external inputs, or both. FIG. 9 indicates five example security levels. Level 1 represents the highest possible security level (i.e. the highest security requirements, or the strongest security) whereas level 5 represents the lowest level (basically clear communication without any dedicated security measures).

The acronyms describing each example security level in FIG. 9 have the following meanings:

MD5: 'Message-Digest algorithm 5'. The MD5 algorithm is used as an encryption or fingerprint function for a file. Often used to encrypt database passwords, MD5 is also able to generate a file thumbprint to ensure that a file is identical after a transfer for example.

AH: Authentication Header. The AH protocol provides a mechanism for authentication only. AH provides data integrity, data origin authentication, and an optional replay protection service. Data integrity is ensured by using a message digest that is generated by a hash algorithm such as HMAC-MD5 or HMAC-SHA. Data origin authentication is ensured by using a shared secret key to create the message digest. Replay protection is provided by using a sequence number field with the AH header. AH authenticates IP headers and their payloads, with the exception of certain header fields that may be legitimately changed in transit, such as the Time To Live (TTL) field. For completeness, HMAC (keyed-hash message authentication code or hash-based message authentication code) is a specific type of message authentication code (MAC) involving a cryptographic hash function and a secret cryptographic key. As with any MAC, it may be used to simultaneously verify both the data integrity and authenticity of a message. HMAC may provide authentication using a shared secret instead of using digital signatures with asymmetric cryptography. It trades off the need for a complex public key infrastructure by delegating the key exchange to the communicating parties, who are responsible for establishing and using a trusted channel to agree on the key prior to communication. The MD5 message-digest algorithm is a widely used hash function producing a 128-bit hash value. MD5 was designed by Ronald Rivest in 1991 to replace an earlier hash function MD4 and was specified in 1992 as RFC 1321.

SHA: The Secure Hash Algorithms are a family of cryptographic hash functions published by the National Institute of Standards and Technology (NIST) as a U.S. Federal Information Processing Standard (FIPS). This SHA family works by transforming the data using a hash function: an algorithm that consists of bitwise operations, modular additions, and compression functions. The hash function then produces a fixed-size string that looks nothing like the original. These algorithms are designed to be one-way functions, meaning that once they're transformed into their respective hash values, it's virtually impossible to transform them back into the original data. A few algorithms of interest are SHA-1, SHA-2, and SHA-3, each of which was successively designed with increasingly stronger encryption in response to hacker attacks. SHA-0, for instance, is now obsolete due to the widely exposed vulnerabilities.

DES: The Data Encryption Standard is a symmetric-key block cipher, meaning a cryptographic key and algorithm are applied to a block of data simultaneously rather than one bit at a time. To encrypt a plaintext message, DES groups it into 64-bit blocks. DES was created in the early 1970s by an IBM team and adopted by the National Institute of Standards and Technology (NIST). The DES algorithm is used whenever a not-very-strong encryption is needed. It may be used in random number generators or even as a permutation generator. DES is also an ANSI and ISO standard. Because DES was designed to run on 1977 hardware, it is rapid in hardware and associatively quick in software. It supports functionality to save a file in an encrypted format which may only be accessed by supporting the correct password.

AES: Advanced Encryption Standard (AES), introduced in 2001, is an encryption standard used by the United States government to protect data in federal information systems. It is also used by nongovemmental organizations to protect sensitive data. The AES algorithm uses "symmetric" key encryption and three block ciphers. Symmetric key encryption uses the same key to encrypt and decrypt data. Sometimes the same key is described as a secret key. It is critical that the secret key is only available to authorized users to prevent anyone else from accessing the key and accessing the data for nefarious reasons.

ESP: Encapsulating Security Payload (ESP) is a member of the Internet Protocol Security (IPsec) set of protocols that encrypt and authenticate the packets of data between computers using a Virtual Private Network (VPN). The focus and layer on which ESP operates makes it possible for VPNs to function securely. The ESP protocol provides data confidentiality (encryption) and authentication (data integrity, data origin authentication, and replay protection). ESP may be used with confidentiality only, authentication only, or both confidentiality and authentication. When ESP provides authentication functions, it uses the same algorithms as AH, but the coverage is different. AH-style authentication authenticates the entire IP packet, including the outer IP header, while the ESP authentication mechanism authenticates only the IP datagram portion of the IP packet.

Each security level may be defined by an Authentication function and an Encryption function (which may include no authentication/no encryption). The different security levels that may be implemented may have different/specific performance requirements. FIG. 10 shows the requirements that need to be investigated beforehand in order to assess the impact of each security level on the device's overall performance. For example, security level 1 has the following performance requirements: energy E1, memory M1, computation C1, delay Nd1, packet los Np1, and throughput Nt1. These requirements may be defined as performance specifications that the device must meet in order to implement them, or they may be defined as the drain on the device's resources, for example over a period of time. For instance, security level 3 will drain computation power C3 from the device over a period of time (e.g. one hour). As shown, security measures may have a direct impact on energy consumption, memory usage, and computation power, and may also directly affect the device's communication network performance by affecting network delays, Packet loss ratios, and overall network throughput.

Some method embodiments include using a graphical user interface (GUI). A user may use the GUI to input information such as values of measurements and/or rules and/or a location/environment in which the device is currently located or will be located and/or information about security levels. The information about security levels may include encryption and/or authentication functions/policies to be implemented with a security level. The GUI may be provided on/by an apparatus separate from the device, and may be used to provide input data for the one device or for a plurality of such devices. The GUI may be provided by/on the device itself. The GUI may allow the selection of measurements/input values to use in the inference process. The GUI may allow the selection of a measurement for which an input value will be entered. The GUI may display the measurements being used for the inference process. The GUI may display the security levels and their authentication/encryption functions/policies currently available for use (i.e. which the device may determine to use).

An example of carrying out the method for implementing a security level for devices in an IoT system will now be described.

A device determines and implements a security policy itself in this example. In the example, each IoT device uses three measurements for determining the security level, namely: Available energy, Available memory, and the current score for external Threat. These three measurements represent the inputs for the Fuzzy Inference System (values of these measurements are used). The obtained output is a weight parameter for Risk chosen between 0 and 1, i.e. the numerical value described above. This is then used to determine a security level which is then applied.

Figure 11:
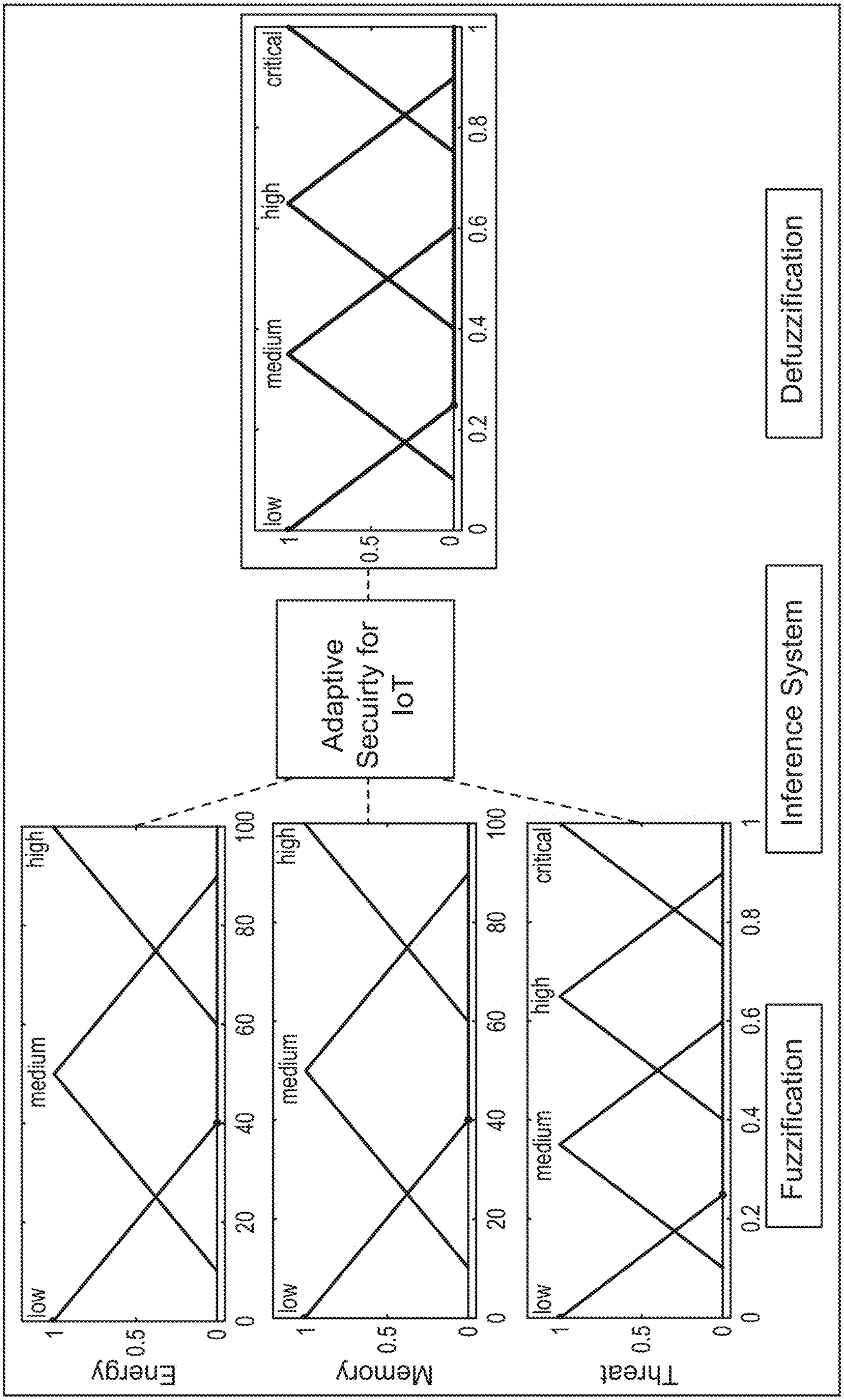
FIG. 11 is a diagram useful for understanding an example application.

FIG. 11 illustrates an overview of this example. A first step, on the left, is the Fuzzification process, where the numerical inputs, called crisp values, or simply values, are matched with the corresponding linguistic variables and truth values are determined. This corresponds to step S92. The second step, Inference System, represents the core of the fuzzy logic system. It is the step in which the Fuzzy Inference Engine solicits a Rules' Base in order to compute the fuzzy values of the outputs (the risk truth values). This corresponds to step S94. The third step is Defuzzification, which represents the reverse process of fuzzification. The risk linguistic variables' values for the system output (the risk truth values) are projected according to their risk membership functions in order to determine a crisp (numerical) value for the corresponding risk—the numerical value described above. This corresponds to step S96. The underlying details for all these three steps are described in the following subsections. The method of this example also includes the other steps of FIG. 8 but these are not shown in FIG. 11.

Fuzzification

In fuzzy sets theory, fuzzification is the process of transforming crisp quantities into fuzzy values (crisp to fuzzy). This conversion is based on membership functions, which are used to determine a grade for each linguistic variable (i.e. a truth value indicating how well the linguistic variable corresponding to the membership function describes the value of the measurement) It represents the first level of a fuzzy inference system, in which the real scalar values of the inputs are changed into fuzzy values. The method in this example comprises receiving values for three measurements (energy, storage, threat). Different membership functions are defined for each of the inputs as depicted in FIGS. 12(*a*)-12(*c*).

In practice, different methods may be used to determine the number of linguistic variables required and how to assign them corresponding membership functions. This process may be accomplished by a subject matter expert. Heuristic or logical-based processes such as neural networks or genetic algorithms may also/alternatively be used to optimise the selection of membership functions. Generally, membership functions and linguistic variables may be determined through trial-and-error iterations. The membership functions and linguistic variables may depend on the specific application/use case at hand.

FIG. 12.(*a*) represents the membership functions for the first input, namely Energy level. Its corresponding linguistic variables are: (i) low, (ii) medium, and (iii) high. Likewise, FIG. 12.(*b*) shows the membership functions for the second input, which is Available Memory. It consists of the three linguistic variables: (i) low, (ii) medium, and (iii) high. Finally, FIG. 12.(*c*) shows the membership functions for Threat level. Its corresponding linguistic variables are: (i) low, (ii) medium, (iii) high, and (iv) critical.

The measurement "threat level" may be defined by a combination of measurements related to the environment of the device, for example any of those shown in FIG. 9. It may correspond to only one of those measurements, for example distance to the other device with which the device is configured to communicate. It may be decided by a user (subject-matter expert) based on the current environment/circumstances of the device/system.

"Energy" may be the energy remaining in the device's battery measured by the device. "Storage" may be the remaining available storage space in the device's memory measured by the device.

Inference System

The inference system step represents the decision-making process of the method, an operation of the fuzzy logic engine. This decision-making process is performed through a decisive fuzzy inference engine, in which the decision is made over a suitable predefined rule base. Each entry in this rule base has an IF-THEN statement, with "AND" or "OR" connectors to make the necessary links amongst the fuzzy variables. Creating the rule base may be performed before the method is carried out, for example by a subject-matter expert and/or computationally and/or using historical data and/or trial-and-error. The rule base for this example is represented by FIG. 13, which shows the risk linguistic variables ("low", "medium", "high", "critical") resulting from each combination of linguistic variables for the measurements. There are 36 different cases, representing all the possible linguistic variable combinations of the three measurements, that is, 36 variable-value pair combinations. The following examples show the structure of the "IF-THEN" statements used to implement the rule base:

IF Memory is low AND Threat is low THEN Risk is high;

IF Energy is high AND Memory is medium AND Threat is low THEN Risk is low;

IF Energy is high AND Memory is low AND Threat is medium THEN Risk is high;

IF Energy is low AND Memory is low AND Threat is high THEN Risk is critical;

FIG. 14 illustrates the 21 rules of the rule base used to determine a risk linguistic variable based on a combination of linguistic variables (one for each measurement: energy, storage, threat). Of course, where a rule only uses two conditions, this is because the rule applies for all combinations with these two conditions. That is, the risk linguistic variable is always low according to a combination of the linguistic variable "low" for memory and the linguistic variable "low" for threat, for any linguistic variable for "energy". This is why there are only 21 rules for the 36 combinations of linguistic variables.

Each of the 36 combinations may lead to a risk linguistic variable and a risk truth value, i.e. an output variable-value pair. The risk truth value of a combination is determined based on the truth values associated with the linguistic variables of the combination, as described above. Of course, not all linguistic variables for every measurement will have a non-zero truth value. For example, the measurement value for memory may be such that the membership function for the linguistic variable "low" is zero. In this case, there may be no output variable-value pairs determined according to rules which require the linguistic variable of "low" for the memory. In this case, the rules which do give rise to output variable-value pairs may be referred to as "activated" rules.

Defuzzification

Defuzzification is the process of producing a quantifiable value (numerical value) based on the corresponding fuzzy logic variables (risk linguistic variables) and their corresponding membership degrees/truth values, as described above. This may be considered a fuzzy to crisp conversion. In this example, this process is implemented through the four corresponding membership functions illustrated in FIG. 13.

In contrast to black-box-like techniques which take training data and generate opaque unexplainable models, fuzzy logic may rely on (and approximates) the human cognitive experience and understanding of a system. The rule-base used in the example uses 21 different entries, shown in FIG. 14, to implement all the 36 possible combinations shown in FIG. 13.

FIGS. 16A-16C are graphical depictions showing how the numerical value output (y-axis) varies with each measurement (x-axis) (whilst the other two measurement values are held constant). That is, FIGS. 16A-16C illustrate a visual representation for the input/output correlation, i.e. FIGS. 16A-16C show the impact that each input has on the overall output independently from the values of two other inputs.

FIGS. 17A-17C show the impact in a different way. FIG. 17A shows the impact of threat and energy on the numerical value (with memory held constant), for example. These 3D projections in FIGS. 17A-17C show the joint impact of the measurements two-by-two on the system output (numerical value).

Some of the considerations in determining the rule base (and shown in FIGS. 16A-16C and FIGS. 17A-17C) are as follows.

- IoT devices with low energy level need to preserve the limited energy available, thus need to lower the security level to stay active for longer. Inversely those with a high level of available energy are expected to last longer therefore are able to implement more resource-intensive security levels and thus the numerical value increases with energy up to a point as shown in FIG. 16A. However devices with very high energy face less risk related to their energy level compared to devices with lesser energy, as they are likely to be able to handle an attack more effectively, thus the numerical value falls as energy increases above a certain point, as shown in FIG. 16A.
- When the available memory of a device is very small, it would be difficult to implement higher security measures, consequently the numerical is low. The numerical value then increases with memory as the device is able to accommodate more resource-intensive measures, and furthermore, when considerable amount of memory is available, the IoT device has better chances to counter security risks, thus the numerical value falls with increasing memory above a certain point, as shown in FIG. 16B.

The external threat affects the overall risk differently compared to the energy and memory. As shown in FIG. 16C, the numerical value, in general, increases with increasing threat level. The numerical value is low when the threat is low and inversely, the higher the threat value is, the higher the numerical value will be.

FIGS. 18 and 19 show two running examples with different values for the three inputs and the resulting output. For the first example, when the available energy value is 25%, the available memory is 75%, and the perceived external threat level is 0.85, then the overall risk value would be equal to: 0.624. In the second example, if only 15% on energy is available; and 25% of memory may still be used; and the perceived external threat is estimated to be 0.35, then the overall system risk value will be equal to 0.587. In each of FIGS. 18 and 19, the first three columns on the left represent the three inputs, from left to right: energy, memory and threat, respectively, while the column on the right represents the output: security level (or risk). The 21 rows represent the rules shown in FIG. 14. These Figures illustrate which rules in FIG. 14 have been "activated" (and how each activated rule has impacted the calculation of the final value (risk/security level)).

Specifically, in FIG. 18, using 25, 75 and 0.85, as the measurements for energy, memory and threat respectively, the following rules were activated: 15, 16, 17, 19 and 21. These rules are "activated" because, for each rule the linguistic variable(s) specified in the rule for each of the measurement had a corresponding non-zero truth value. That is, looking at rule 15, a value of 25 for energy gives a non-zero truth value for "low", 75 for memory gives a non-zero truth value for "medium" and/or "high", and 0.85 for threat level gives a non-zero truth value for "high".

Still looking at FIG. 18, the aggregation of the output for these 5 rules is shown as a dark surface under the graph on the bottom right side of the figure. The centre of gravity (COG) of this graph (through the defuzzification process) gives the value 0.624 as a crisp value for the output. Similarly, in FIG. 19, with 15, 25 and 0.35 as input values for energy, memory and threat respectively, the activated rules were: 7, 8, 9, 10 and 11. The crisp value for the output in this case is: 0.587.

FIG. 18. example 1: [energy: 25%; memory: 75%; threat: 0.85]>>Risk: 0.624

FIG. 19. example 2: [energy: 15%; memory: 25%; threat: 0.35]>>Risk: 0.587

The disclosed methodology may be applied in any scenario involving adaptive risk evaluation.

Depending on the particular use case at hand, an overall adaptive security system design would start by properly identifying the required inputs and how they might affect the output. The second stage would focus on implementing the Fuzzy Inference System for decision making. And finally, appropriate security measures/levels would be set.

Use cases in which the methodology could be applied may also cover the following:

Risk management systems where a trade-off between two or more contending measures is needed.

Other constrained devices with limited capabilities/resources.

The approach may be applied in a distributed system where an emerging global behaviour may be reached through individual actions (decisions).

The disclosed methodology aims at improving cybersecurity of constrained devices by implementing security measures depending on context, for example in a real-time manner and without human intervention. By taking into account external factors (environmental threats) and internal ones (devices vulnerabilities), the computed risk score (numerical value) is optimised and adapted accordingly, thus optimising the overall system response by finding the right performance balance between security and service availability.

Some benefits of the disclosed methodology are summarised as follows:

Offer faster security response through the automated real-time adaptation of security measures. A human operator would no longer be needed to control the security response after identifying changes in context.

Offer the benefits of proactive cyber security decision making by identifying and addressing security risks before an attack occurs (reactive cyber security involves defending against attacks that have already happened). Depending on the ever-changing context, the most appropriate security measures are always selected and implemented.

By selecting the most suitable cyber security measures, higher performances would be achieved using the proposed adaptive security decision model resulting in an increased QoS. This is especially true when the evaluated risk is low, thus implementing lighter security measures, which would result in turn in lower resource utilisation and higher overall system performances compared to the standard security measure.

Similar to the previous point, each time the context would allow, the newly proposed model would also lead to lower resource utilisation in terms of: Computation, Communication, Storage and Energy. Lowering the utilisation of the already constrained resources would lead to longer battery lifetime, thus improving the overall system availability.

Adapting the deployed security measures would optimise the resource utilisation, thus resulting into lesser budgetary investments towards more advanced IoT devices. Specifically, comparable performances would be eventually achieved using optimised simpler devices compared to advanced devices.

In summary, this disclosure relates to a computer-implementable proactive method for automatically performing adaptive security and privacy preserving operations, comprising:

a) Assessment of Internal vulnerabilities.
b) Evaluation of external threats.
c) Computing the relevant risk score.
d) Selecting a mitigation plan (security level to be implemented).

As a summary, some benefits are:

i. Enhance the security of IoT systems in the considered e-Health use case.
ii. Effectively address the shortcomings related to the constrained nature of IoT devices.
iii. Improve the agility and reliability of IoT deployments.
iv. Increase the trust in IoT devices through higher security without compromising on reliability.

FIG. 21 is a block diagram of an information processing apparatus 10 or a computing device 10, such as a data storage server, which embodies the present invention, and which may be used to implement some or all of the operations of a method embodying the present invention, and perform some or all of the tasks of apparatus of an embodiment. The computing device 10 may be used to implement any of the method steps described above, e.g. any of steps S80-S100.

The computing device 10 comprises a processor 993 and memory 994. Optionally, the computing device also includes a network interface 997 for communication with other such computing devices, for example with other computing devices of invention embodiments. Optionally, the computing device also includes one or more input mechanisms such as keyboard and mouse 996, and a display unit such as one or more monitors 995. These elements may facilitate user interaction. The components are connectable to one another via a bus 992.

The memory 994 may include a computer readable medium, which term may refer to a single medium or multiple media (e.g., a centralized or distributed database and/or associated caches and servers) configured to carry computer-executable instructions. Computer-executable instructions may include, for example, instructions and data accessible by and causing a computer (e.g., one or more processors) to perform one or more functions or operations. For example, the computer-executable instructions may include those instructions for implementing a method disclosed herein, or any method steps disclosed herein, for example any of steps S80-S100. Thus, the term "computer-readable storage medium" may also include any medium that is capable of storing, encoding or carrying a set of instructions for execution by the machine and that cause the machine to perform any one or more of the method steps of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement any of the method steps described herein. The memory 994 stores data being read and written by the processor 993 and may store rules and/or values and/or lengths of time (to compare against thresholds) and/or information about security levels and/or encryption algorithms and/or authentication algorithms and/or input data and/or other data, described above, and/or programs for executing any of the method steps described above.

As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein. The processor 993 may be considered to comprise any of the modules described above. Any operations described as being implemented by a module may be implemented as a method by a computer and e.g. by the processor 993.

The display unit 995 may display a representation of data stored by the computing device, such as a representation of what security level is determined/applied and/or GUI windows and/or interactive representations enabling a user to interact with the apparatus 10 by e.g. drag and drop or selection interaction, and/or any other output described above, and may also display a cursor and dialog boxes and screens enabling interaction between a user and the programs and data stored on the computing device. The input mechanisms 996 may enable a user to input data and instructions to the computing device, such as enabling a user to input any user input described above.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball etc may be included in the computing device.

Methods embodying the present invention may be carried out on a computing device/apparatus 10 such as that illustrated in FIG. 21. Such a computing device need not have every component illustrated in FIG. 21, and may be composed of a subset of those components. For example, the apparatus 10 may comprise the processor 993 and the memory 994 connected to the processor 993. Or the apparatus 10 may comprise the processor 993, the memory 994 connected to the processor 993, and the display 995. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The above-described embodiments of the present invention may advantageously be used independently of any other of the embodiments or in any feasible combination with one or more others of the embodiments.

The invention claimed is:

1. A computer-implemented method, comprising:

receiving a value for each of a plurality of measurements relating to a device, the measurements representing at least two of:

an energy level of a battery in the device;

an available memory of a processor in the device;

a clock speed of a processor in the device;

a bandwidth of a communication channel of the device;

a distance between the device and another device with which the device is configured to communicate;

a frequency of movement of the device; and a received signal strength indication, RSSI, of a signal from the other device with which the device is configured to communicate;

performing an inference process to determine a security policy for the device; and applying the determined security policy, wherein the inference process comprises:

providing a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable;

for each of the measurements, using the plurality of membership functions provided for the measurement to determine a plurality of truth values, respectively;

providing for each of the measurements a plurality of variable-value pairs each comprising a said linguistic variable and its corresponding determined truth value; and determining a plurality of output variable-value pairs corresponding respectively to a plurality of variable-value pair combinations, wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination, wherein the inference process further comprises:

aggregating the plurality of output variable-value pairs to determine a numerical value representing the risk of attack on the device and a capability of the device to implement security measures; and determining, from among a plurality of distinct security policies having different resource requirements, the security policy to apply according to the determined numerical value representing the risk of attack on the device and the capability of the device to implement security measures.

2. The computer-implemented method as claimed in claim 1, wherein determining the security policy comprises determining to apply a first security policy when the determined numerical value is in a first range and determining to apply a second security policy when the numerical value is in a second range.

3. The computer-implemented method as claimed in claim 1, wherein the rules defining mappings between the risk linguistic variables and combinations of linguistic variables of the measurements comprise if-then rules and/or if-and-then rules.

4. The computer-implemented method as claimed in claim 1, wherein the device is a sensor for detecting a physiological measurement of a patient.

5. The computer-implemented method as claimed in claim 1, comprising performing the inference process and applying the security policy determined as a result of the inference process when a threshold amount of time has expired since the most recent occurrence of performing the inference process.

6. The computer-implemented method as claimed in claim 1, comprising: monitoring the values of the measurements; and performing the inference process and applying the security policy determined as a result of the inference process when, for any of the measurements, a difference between a current value and a value used in the most recent occurrence of the inference process is above a threshold change amount.

7. The computer-implemented method as claimed in claim 1, comprising performing the inference process and applying the security policy determined as a result of the inference process when the device changes location.

8. The computer-implemented method as claimed in claim 1, comprising receiving a value of a measurement representing an environment of the device, the value of the measurement being a score indicating a threat of attack on the device based on the environment.

9. The computer-implemented method as claimed in claim 1, comprising determining the security policy for communication with another device.

10. The computer-implemented method as claimed in claim 1, comprising transmitting information indicating the determined security policy to the other device with which the device is configured to communicate.

11. The computer-implemented method as claimed in claim 1, wherein applying the determined security policy comprises encrypting communications transmitted from the device according to an encryption policy corresponding to the security policy.

12. The computer-implemented method as claimed in claim 1, wherein the measurement representing the threat of attack on the device comprises:

the distance between the device and another device with which the device is configured to communicate; or the RSSI of a signal from the other device with which the device is configured to communicate; or a combination of the distance between the device and another device with which the device is configured to communicate and the RSSI of a signal from the other device with which the device is configured to communicate.

13. A computer program which, when run on a computer, causes the computer to carry out a method comprising:

receiving a value for each of a plurality of measurements relating to a device, the measurements representing at least two of:

an energy level of a battery in the device;

an available memory of a processor in the device;

a clock speed of a processor in the device;

a bandwidth of a communication channel of the device;

a distance between the device and another device with which the device is configured to communicate;

a frequency of movement of the device; and a received signal strength indication, RSSI, of a signal from the other device with which the device is configured to communicate;

performing an inference process to determine a security policy for the device; and applying the determined security policy, wherein the inference process comprises:

providing a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable;

for each of the measurements, using the plurality of membership functions provided for the measurement to determine a plurality of truth values, respectively;

providing for each of the measurements a plurality of variable-value pairs each comprising a said linguistic variable and its corresponding determined truth value; and determining a plurality of output variable-value pairs corresponding respectively to a plurality of variable-value pair combinations, wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination;

wherein the inference process further comprises:

aggregating the plurality of output variable-value pairs to determine a numerical value representing the risk of attack on the device and a capability of the device to implement security measures; and determining, from among a plurality of distinct security policies having different resource requirements, the security policy to apply according to the determined numerical value representing the risk of attack on the device and the capability of the device to implement security measures.

14. An information processing apparatus comprising a memory and a processor connected to the memory, wherein the processor is configured to implement a security policy for a device by:

receiving a value for each of a plurality of measurements, the measurements representing at least two of:

an energy level of a battery in the device;

an available memory of a processor in the device;

a clock speed of a processor in the device;

a bandwidth of a communication channel of the device;

a distance between the device and another device with which the device is configured to communicate;

a frequency of movement of the device; and a received signal strength indication, RSSI, of a signal from the other device with which the device is configured to communicate;

performing an inference process to determine the security policy for the device; and applying the determined security policy, wherein the inference process comprises:

providing a plurality of membership functions for each of the measurements, the membership functions corresponding respectively to a plurality of linguistic variables for describing the magnitude of the measurement's value, each membership function defining a mapping between the measurement's value and a truth value indicative of how well the measurement's value is described by the corresponding linguistic variable;

for each of the measurements, using the plurality of membership functions provided for the measurement to determine a plurality of truth values, respectively;

providing for each of the measurements a plurality of variable-value pairs each comprising a said linguistic variable and its corresponding determined truth value; and determining a plurality of output variable-value pairs corresponding respectively to a plurality of variable-value pair combinations, wherein each output variable-value pair comprises one of a plurality of risk linguistic variables for describing the magnitude of risk of attack on the device and a risk truth value, wherein for each output variable-value pair the risk linguistic variable is determined based on the linguistic variables of the corresponding variable-value pair combination and using rules defining mappings between the risk linguistic variables and combinations of linguistic variables of the measurements, and wherein for each output variable-value pair the risk truth value is determined based on the truth values of the corresponding variable-value pair combination;

wherein the inference process further comprises:

aggregating the plurality of output variable-value pairs to determine a numerical value representing the risk of attack on the device and a capability of the device to implement security measures; and determining, from among a plurality of distinct security policies having different resource requirements, the security policy to apply according to the determined numerical value representing the risk of attack on the device and the capability of the device to implement security measures.

15. A computer-implemented method comprising:

receiving a value for each of a plurality of measurements relating to a device, the measurements representing at least two of:

an energy level of a battery in the device;

an available memory of a processor in the device;

a clock speed of a processor in the device;

a bandwidth of a communication channel of the device;

a distance between the device and another device with which the device is configured to communicate;

a frequency of movement of the device; and a received signal strength indication, RSSI, of a signal from the other device with which the device is configured to communicate;

performing an inference process to determine a security policy for the device; and applying the determined security policy, wherein the inference process comprises:

using a plurality of membership functions provided for each of the measurements to determine truth values indicative of how well the measurement's value is described by respective linguistic variables corresponding to the respective membership functions;

determining a plurality of risk linguistic variables based at least on combinations of the said linguistic variables, and determining a plurality of corresponding risk truth values based on the truth values of the linguistic variables of the combinations; and determining a numerical value representing a risk of attack on the device and a capability of the device to implement security measures, based on the risk linguistic variables and the corresponding risk truth values, and determining, from among a plurality of distinct security policies having different resource requirements, the security policy according to the numerical value.

* * * * *